US 12,179,131 B2

(12) United States Patent
Kadam et al.

(10) Patent No.: US 12,179,131 B2
(45) Date of Patent: Dec. 31, 2024

(54) FILTRATION ELEMENT WITH GRADIENT SEAL INTERFACE

(71) Applicant: Cummins Filtration IP, Inc., Columbus, IN (US)

(72) Inventors: Pravin Shantinath Kadam, Kolhapur (IN); Sudhindra Palaxa Arakeri, Shahapur (IN); Peter K. Herman, Stoughton, WI (US); Kevin C. South, Cookeville, TN (US)

(73) Assignee: Cummins Filtration IP, Inc., Columbus, IN (US)

( * ) Notice: Subject to any disclaimer, the term of this patent is extended or adjusted under 35 U.S.C. 154(b) by 528 days.

(21) Appl. No.: 17/529,893

(22) Filed: Nov. 18, 2021

(65) Prior Publication Data

US 2022/0072454 A1 Mar. 10, 2022

Related U.S. Application Data

(63) Continuation of application No. PCT/US2020/032812, filed on May 14, 2020.

(30) Foreign Application Priority Data

May 20, 2019 (IN) .............................. 201941019992

(51) Int. Cl.
*B01D 29/21* (2006.01)
*B01D 27/08* (2006.01)
(Continued)

(52) U.S. Cl.
CPC ............. *B01D 29/21* (2013.01); *B01D 27/08* (2013.01); *B01D 35/147* (2013.01); *B01D 35/30* (2013.01);
(Continued)

(58) Field of Classification Search
CPC ...... B01D 29/21; B01D 27/08; B01D 35/145; B01D 35/30; B01D 2201/295;
(Continued)

(56) References Cited

U.S. PATENT DOCUMENTS 4,168,237 A * 9/1979 Pickett .................. B01D 27/08
210/DIG. 17
2005/0252848 A1 11/2005 Miller
(Continued)

FOREIGN PATENT DOCUMENTS

CN 105517684 A 4/2016
CN 106413842 A 2/2017
(Continued)

OTHER PUBLICATIONS

International Search Report and Written Opinion issued for PCT Application No. PCT/US2020/032812 issued Jul. 28, 2020, 8 pages.
(Continued)

*Primary Examiner* — Liam Royce
(74) *Attorney, Agent, or Firm* — Foley & Lardner LLP

(57) ABSTRACT

A liquid filtration system includes a filter head, a shell housing, and a filter cartridge. The filter head includes a skirt having a ramp disposed at a first end of the skirt. The shell housing is coupled to the filter head. The filter cartridge is disposed within the shell housing. The filter cartridge includes a filter media pack and am endcap coupled to a first end of the filter media pack. The endcap includes an interface member extending from an upper surface of the endcap. The interface member includes a sealing member that is at least partially tilted at an oblique angle relative to a central axis of the endcap. The sealing member is sealingly engaged with the skirt.

20 Claims, 21 Drawing Sheets

(51) Int. Cl.
  *B01D 35/147* (2006.01)
  *B01D 35/30* (2006.01)
(52) U.S. Cl.
  CPC .. *B01D 2201/295* (2013.01); *B01D 2201/302* (2013.01); *B01D 2201/304* (2013.01); *B01D 2201/34* (2013.01); *B01D 2201/4007* (2013.01); *B01D 2201/4076* (2013.01)
(58) Field of Classification Search
  CPC ........ B01D 2201/302; B01D 2201/304; B01D 2201/34; B01D 2201/4007; B01D 2201/4076
  See application file for complete search history.

(56) References Cited

U.S. PATENT DOCUMENTS

| | | | | |
|---|---|---|---|---|
| 2007/0267338 | A1* | 11/2007 | Menez | B01D 29/21 210/348 |
| 2008/0223815 | A1 | 9/2008 | Konrad | |
| 2012/0037556 | A1 | 2/2012 | Beard et al. | |
| 2014/0033668 | A1* | 2/2014 | Kleynen | B01D 29/21 55/502 |
| 2015/0209705 | A1 | 7/2015 | Morris et al. | |
| 2019/0217229 | A1* | 7/2019 | Rookey | B01D 35/147 |

FOREIGN PATENT DOCUMENTS

| | | | |
|---|---|---|---|
| WO | WO-2005/099862 | | 10/2005 |
| WO | WO-2010/117799 | A2 | 10/2010 |
| WO | WO-2011/086234 | A1 | 7/2011 |
| WO | WO-2018/053168 | A1 | 3/2018 |
| WO | WO-2018067437 | A1 * | 4/2018 ............. B01D 29/21 |

OTHER PUBLICATIONS

Extended European Search Report on EP 20810101.4 DTD Dec. 20, 2022 (7 pages).

First Chinese Office Action and Search Report issued for Chinese Patent Application No. 202080036242.X issued Feb. 15, 2023, with translation.

* cited by examiner

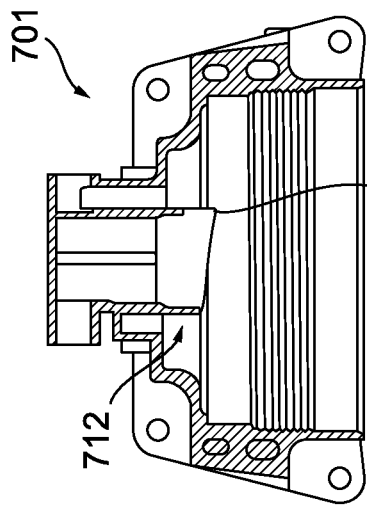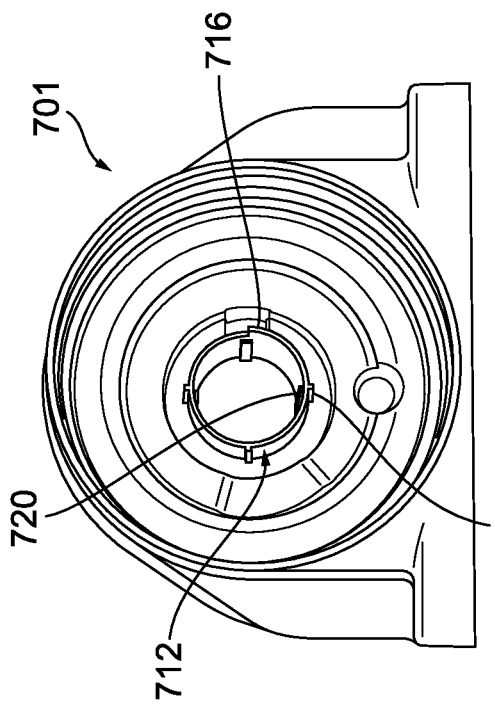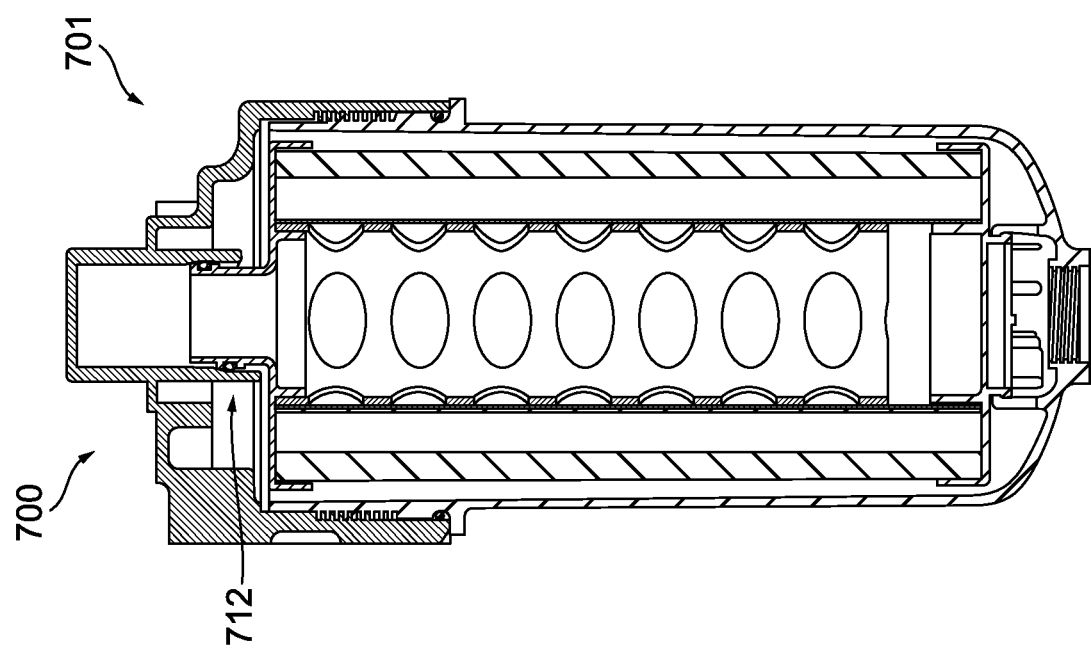

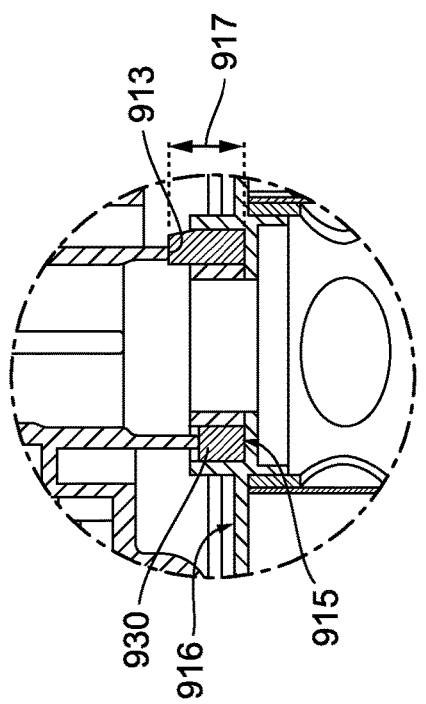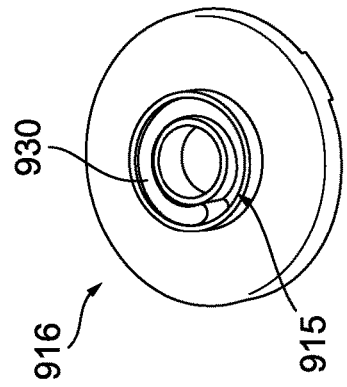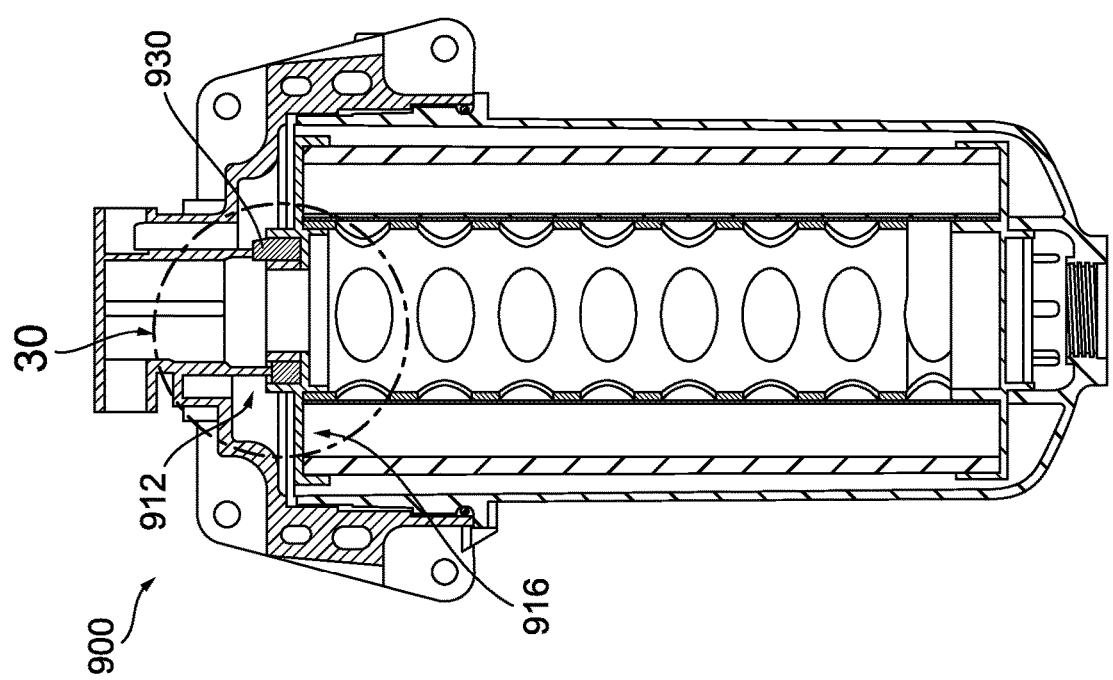

FILTRATION ELEMENT WITH GRADIENT SEAL INTERFACE

CROSS-REFERENCE TO RELATED PATENT APPLICATIONS

The present application is a continuation of PCT Application No. PCT/US2020/032812, filed May 14, 2020, claims the benefit of and priority to Indian patent application No. 201941019992, entitled "Filtration Element with Gradient Seal Interface" and filed May 20, 2019. The contents of these applications are hereby incorporated by reference in their entirety.

TECHNICAL FIELD

The present application relates generally to liquid filtration systems for internal combustion engine systems.

BACKGROUND

In various applications, it is generally desirable to minimize an amount of particulate contamination in liquids used to power and lubricate an internal combustion engine. The amount of particulate contamination can be reduced by passing the liquids through a filter element or cartridge, which captures solid particles entrained within the fluid. The structure of the cartridge and the materials used in the construction of the cartridge are carefully controlled by an original equipment manufacturer (OEM) in order to prevent damage to the engine and to ensure optimal engine performance.

In some instances, a user may choose to replace the filter cartridge with a non-genuine (aftermarket) filter cartridge that is not produced by the OEM. The non-genuine filter cartridge may not adequately remove particulate contamination from the liquid which can, over a period of time, result in damage to the internal combustion engine.

SUMMARY

In one set of embodiments, a liquid filtration system includes a filter head, a shell housing, and a filter cartridge. The filter head includes a skirt having a ramp disposed at a first end of the skirt. The shell housing is coupled to the filter head. The filter cartridge is disposed within the shell housing. The filter cartridge includes a filter media pack and an endcap coupled to a first end of the filter media pack. The endcap includes an interface member extending from an upper surface of the endcap. The interface member includes a sealing member that is at least partially tilted at an oblique angle relative to a central axis of the endcap. The sealing member is sealingly engaged with the skirt.

In another set of embodiments, a liquid filter cartridge includes a filter media pack and an endcap. The endcap is coupled to a first end of the filter media pack. The endcap includes an interface member that extends from an upper surface of the endcap. The interface member includes a sealing member that is at least partially tilted at an oblique angle with respect to a central axis of the filter media pack.

In another set of embodiments, a method of installing a filter cartridge into a liquid filtration system includes providing a filter head, a shell housing, and a filter cartridge. The filter head includes a skirt having a ramp at a first end of the skirt. The filter cartridge includes a filter media pack and an endcap coupled to a first end of the filter media pack. The endcap includes an interface member extending from an upper surface of the endcap. The interface member includes a sealing member that is tilted at an oblique angle with respect to a central axis of the endcap. The method additionally includes joining the filter cartridge to the shell housing, and installing the shell housing onto the filter head to sealingly engage the sealing member to the skirt.

BRIEF DESCRIPTION OF THE FIGURES

The details of one or more implementations are set forth in the accompanying drawings and the description below. Other features, aspects, and advantages of the disclosure will become apparent from the description, the drawings, and the claims, in which:

FIG. 25 is a side cross-sectional view of another liquid filtration system;

FIG. 26 is a side cross-sectional view of a filter head for the liquid filtration system of FIG. 25;

FIG. 27 is a lower perspective view of the filter head of FIG. 26;

FIG. 29 is a side cross-sectional view of still another liquid filtration system;

FIG. 30 is a reproduction of FIG. 29 near a sealing interface;

FIG. 31 is a top perspective view of a first endcap of a filter element for the liquid filtration system of FIG. 29;

Figure 2:
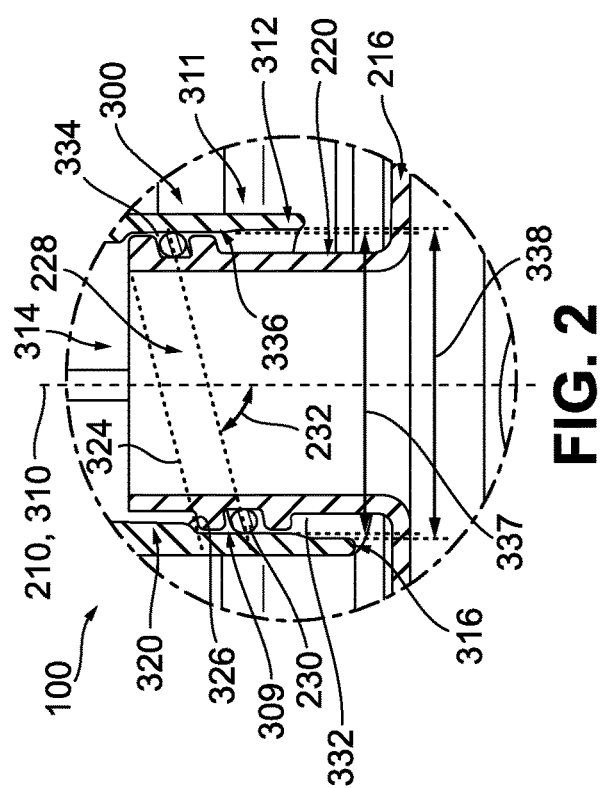
FIG. 2 is a reproduction of FIG. 1 at a location where a filter cartridge of the liquid filtration system engages with a filter head of the liquid filtration system.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for sealing a filter cartridge to a liquid filtration system. The various concepts introduced above and discussed in greater detail below may be implemented in any of numerous ways, as the described concepts are not limited to any particular manner of implementation. Examples of specific implementations and applications are provided primarily for illustrative purposes.

I. Overview

Internal combustion engine systems require a clean source of fuel to power the engine. Unfiltered fuel may include dirt, metal particles, and other solid contaminants that can damage fuel injectors and other engine components. In order to protect the injectors, many internal combustion engine systems include fuel filtration systems, which filter the fuel to remove any solid materials before passing the fuel to the injectors. The filtration system may include a shell housing, a filter head, and a filter cartridge. In operation, the filtration system directs the fuel through the filter cartridge, which includes a media that captures any solid particulate entrained in the fuel. The performance of the filtration system depends, among other factors, on the structure of the filter cartridge and the materials used to construct the filter cartridge (e.g., the materials used to produce a filter media for the filter cartridge, the specifications of the filter media pack such as the flow area of the filter media pack, the pleat depth of the filter media pack, and other factors).

Over time, accumulated particulate on the filter cartridge (e.g., carbon, dust, metal particles, etc.) can increase the pressure drop across the filter cartridge (and, correspondingly, a pressure drop across a fuel delivery system for the engine). In order to reduce the pressure drop, the filter cartridge can be removed from the filtration system and replaced with a clean filter cartridge. In some instances, a user may elect to replace the filter cartridge with a non-genuine (aftermarket) filter cartridge; for example, in order to reduce maintenance costs. However, the filtration performance of the aftermarket filter cartridges can be much lower than an OEM filter cartridge. Over time, operating with the aftermarket filter cartridge may result in damage to the injectors and/or other parts of the engine, thereby leading to a reduction in engine performance.

Implementations herein relate to methods and systems including a unique sealing interface between a filter cartridge and a filter head. The sealing interface includes a sealing member (e.g., O-ring, etc.) extending in a plane that is tilted at an oblique angle relative to a central axis (e.g., longitudinal axis) of the filter cartridge. The sealing member engages a skirt on the filter head at a fixed orientation relative to the skirt to form a seal between sealing member and the skirt. In order to ensure that the sealing member is properly aligned within the skirt during installation, the sealing interface additionally includes an anti-rotation member, which engages (e.g., contacts) a leading edge of the ramped skirt to reorient the filter cartridge into alignment relative to a sealing interface on the filter head. Implementations herein also relate to a filter head that includes a plurality of vertical ribs and/or a plurality of indentations (e.g., grooves) that restrict the use of non-matching, non-genuine filter cartridges including planar radial seals.

I. Example Liquid Filtration System

Figure 1:
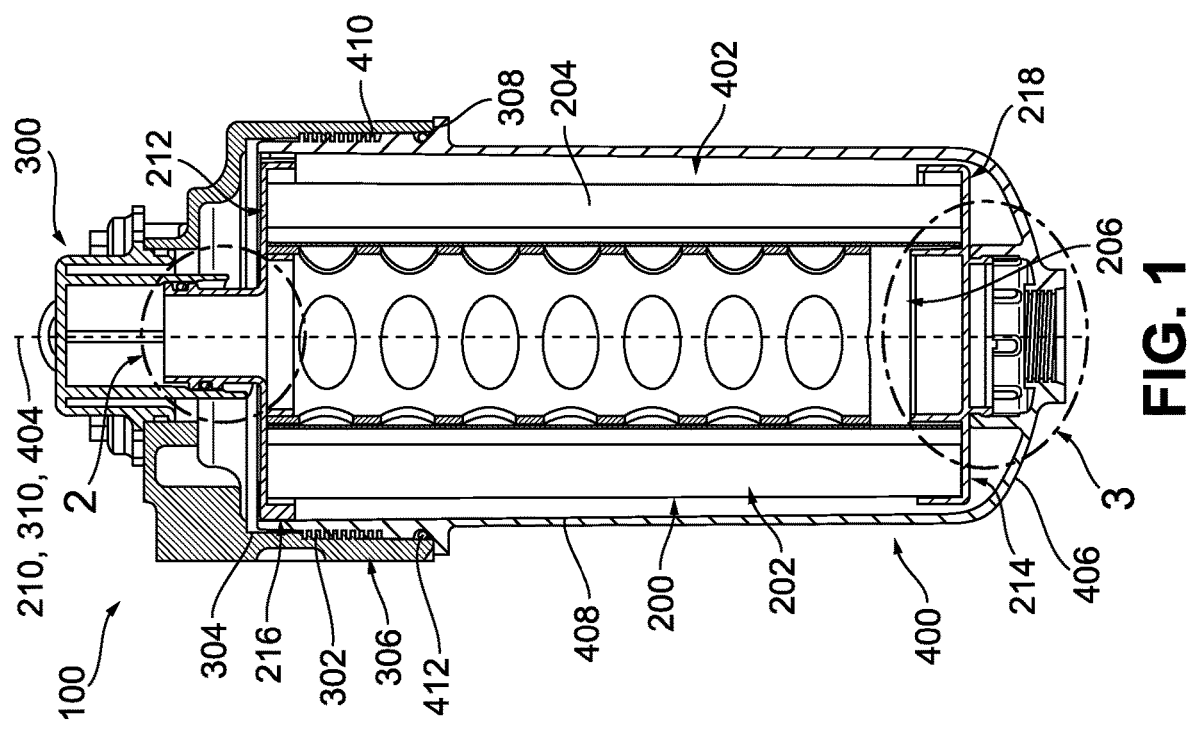
FIG. 1 is a side cross-sectional view of an example liquid filtration system.

FIG. 1 is a perspective view of a first example liquid filtration system, shown as system 100. The system 100 may be used to filter a fluid provided to an internal combustion engine. The fluid may be a fuel, an engine oil, a hydraulic oil, or another lubricant. In the example embodiment of FIG. 1, the system 100 is a fuel filtration system for a diesel engine that uses diesel fuel to drive the combustion process. The system 100 is configured to be mounted on the diesel engine. In other embodiments, the system 100 may be configured to be mounted remotely from the engine (e.g., on a vehicle chassis, etc.).

As shown in FIG. 1, the system 100 includes a filter cartridge 200, a filter head 300, and a shell housing 400. The filter cartridge 200 is disposed within a hollow portion 402 of the shell housing 400 and is coaxial with respect to a central axis 404 of the shell housing 400. The filter cartridge 200 is a cylindrically-shaped cartridge having a cylindrically-shaped filter pack 202. The filter pack 202 includes a filter media 204 configured to filter particulate matter from a fluid flowing therethrough so as to produce filtered fluid (e.g., clean fluid). The filter media 204 may include a porous material having a predetermined pore size. The filter media 204 may include a paper-based filter media, a fiber-based filter media, a foam-based filter media, or the like. The filter media 204 may be pleated or formed into another desired shape to increase a flow area through the filter pack 202, or to otherwise alter the particle removal efficiency of the filter cartridge 200. The filter cartridge 200 may be arranged as an outside-in flow filter cartridge having an outer dirty side and an inner clean side. In an alternative arrangement, the filter cartridge 200 is an inside-out filter cartridge having an inner dirty side and an outer clean side. Fluid to be filtered passes from the dirty side of the filter cartridge 200 to the clean side of the filter cartridge 200.

The filter pack 202 defines a central opening 206 extending along a central axis 210 (e.g., a longitudinal axis, up and down as shown in FIG. 1) of the filter cartridge 200. The central opening 206 is sized to receive a center support tube 208 therein. The support tube 208 extends longitudinally along at least a portion of the central opening 206 from a first, upper end 212 of the filter cartridge 200 to a second, bottom end 214 of the filter cartridge 200. As shown in FIG. 1, the support tube 208 is formed in the shape of a hollow cylinder. An outer wall of the support tube 208 is perforated in order to allow fluid to pass through the support tube 208.

The shell housing 400 defines a hollow portion 402 having an inner cross-sectional diameter within which the filter cartridge 200 is positioned. The shell housing 400 (e.g., a filter housing, container, or reservoir) includes a lower wall 406 and a sidewall 408 extending upwardly from the lower wall 406 in substantially perpendicular orientation relative to the lower wall 406. The shell housing 400 may be formed form a strong and rigid material. For example, the shell housing 400 may be formed from a plastic material (e.g., polypropylene, high density polyethylene, polyvinyl chloride, nylon, etc.), a metal (e.g., aluminum, stainless steel, etc.), or another suitable material. The cross-sectional shape of the shell housing 400 may be the same or similar to the cross-sectional shape of the filter cartridge 200. As shown in FIG. 1, the shell housing 400 is formed in the shape of a cylinder such that the shell housing 400 has a generally circular cross-section normal to the central axis 404 of the shell housing 400. In other embodiments, the shell housing 400 may have any other suitable cross-sectional shape; for example, circular, oval, rectangular, or another suitable shape.

As shown in FIG. 1, the shell housing 400 is threadably coupled to the filter head 300. The shell housing 400 includes a male threaded portion 410 disposed on an outer surface 414 of the shell housing 400 and extending downwardly (e.g., parallel to the central axis 404 of the shell housing 400) from a first, upper end 416 of the shell housing 400. The male threaded portion 410 is engaged with a female threaded portion 302 of the filter head 300. As shown in FIG. 1, the female threaded portion 302 is disposed on an inner surface 304 of an outer flange 306 of the filter head 300 such that, in an installed position (as shown in FIG. 1), the outer flange 306 at least partially surrounds the shell housing 400. The shell housing 400 and/or the filter head 300 may include one or more sealing mechanisms to prevent fluid from leaking into an environment surrounding the system 100. As shown in FIG. 1, the shell housing 400 includes a radial sealing member 412 (e.g., an O-ring, etc.) that presses against the inner surface 304 of the outer flange 306 proximate to a lower edge 308 of the outer flange 306.

Figure 3:
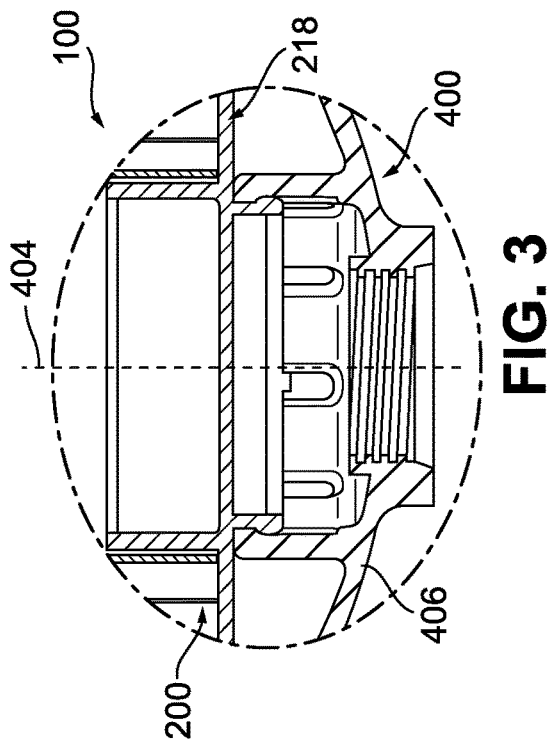
FIG. 3 is a reproduction of FIG. 1 at a location where a filter cartridge of the liquid filtration system engages with a shell housing of the liquid filtration system.

The filter cartridge 200 is structured to detachably (e.g., removably) couple to the shell housing 400 and the filter head 300. The filter cartridge 200 includes a first endcap 216 coupled to the first end 212 of the filter cartridge 200 and a second endcap 218 coupled to the second end 214 of the filter cartridge 200. The first endcap 216 and the second endcap 218 may be coupled to the filter pack 202 using glue or another suitable bonding agent (e.g., adhesive product) in order to seal the first end 212 and the second end 214 of the filter pack 202 and to prevent dirty fluid from bypassing the filter media 204 through the first end 212 and the second end 214. FIGS. 2 and 3 show side cross-sectional views of the system 100 at 1) an interface between the first endcap 216 and the filter head 300 (FIG. 2), and 2) an interface between the second endcap 218 and the shell housing 400 (FIG. 3). As shown in FIG. 2, the first endcap 216 includes an interface member 220 structured to engage with the filter head 300 in order to fluidly couple the filter cartridge 200 to the filter head 300.

Figure 4:
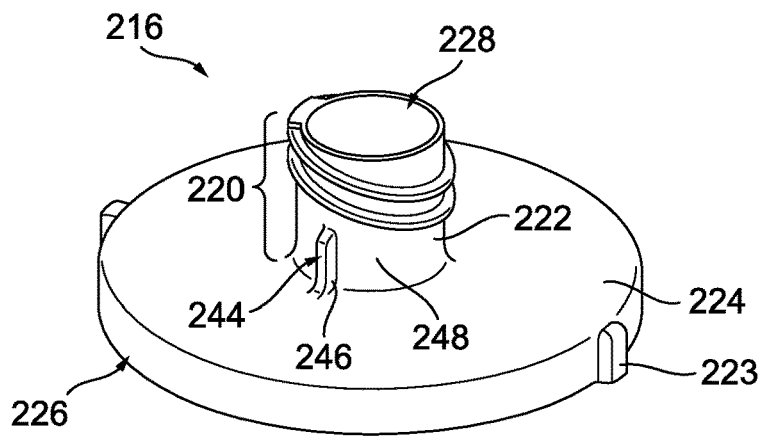
FIG. 4 is a perspective view of a first endcap of a filter cartridge used in the liquid filtration system of FIG. 1.
Figure 5:
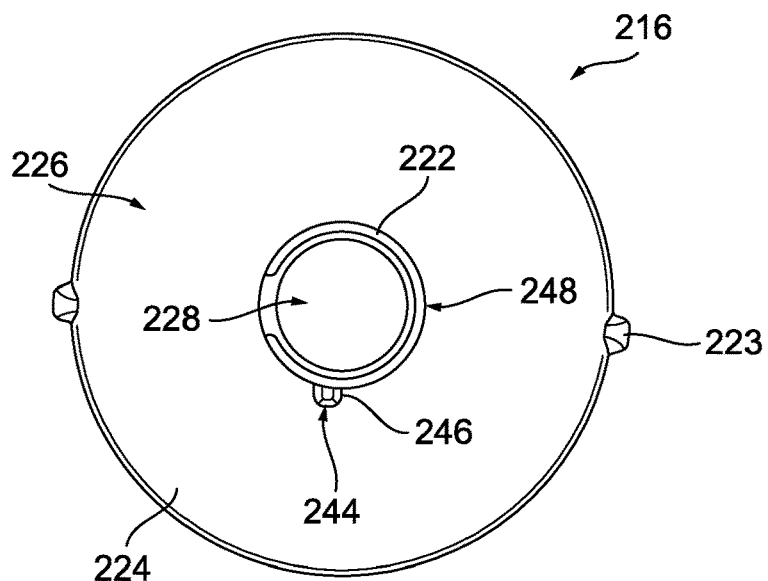
FIGS. 5-6 are top and side views, respectively of the first endcap of FIG. 4.
Figure 6:
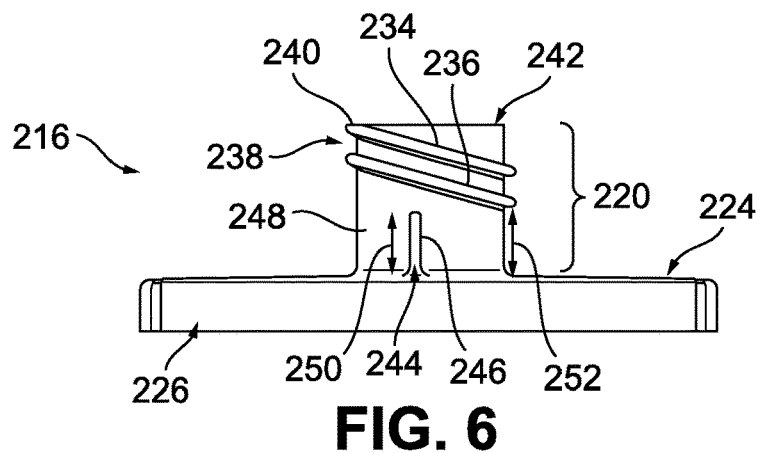
Figure 7:
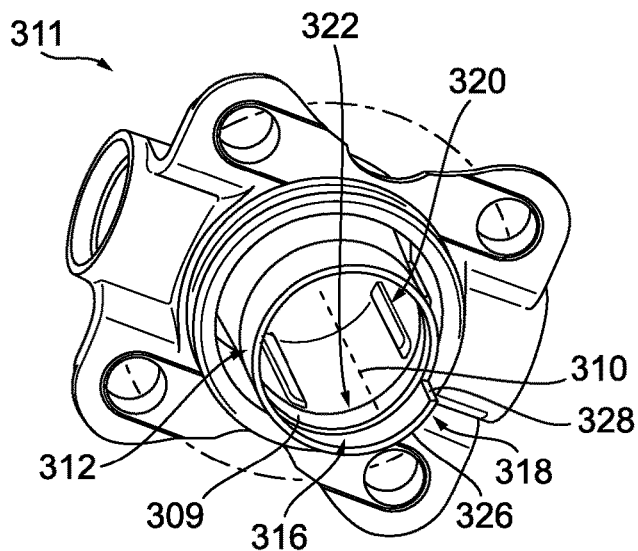
FIG. 7 is a perspective view of a central portion of a filter head for the liquid filtration system of FIG. 1.
Figure 8:
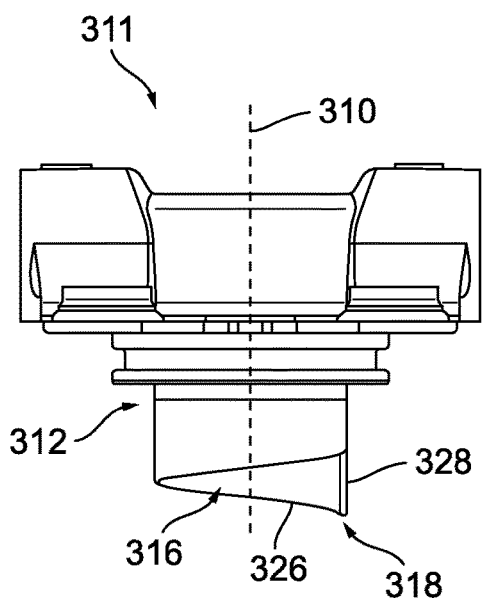
FIG. 8-10 are front, side, and rear views, respectively of the central portion of FIG. 7.

FIGS. 4-6 show perspective, side, and top views, respectively, of the first endcap 216 of the filter cartridge 200. The interface member 220 includes a generally cylindrically-shaped protrusion 222 extending from an upper surface 224 of a base 226 of the first endcap 216. The protrusion 222 extends upwardly (e.g., vertically upwards as shown in FIG. 6) from the upper surface 224 in substantially perpendicular orientation relative to the upper surface 224. The protrusion 222 defines a central opening, shown as through-hole 228 that extends through the first endcap 216. As shown in FIG. 2, the through-hole 228 is axially aligned (in coaxial arrangement) with the central opening 206 of the filter cartridge 200 and a central axis 310 of the filter head 300.

The interface member 220 engages the filter head 300 along an angled sealing interface 309. Among other benefits, the orientation of the sealing interface 309 prevents the use of non-genuine filter cartridges that rely on planar radial sealing elements (e.g., sealing elements that extend normal to the central axis 210 of the filter cartridge 200). As shown in FIG. 2, the interface member 220 additionally includes a sealing member 230 (e.g., an O-ring, etc.) that is sealingly engaged with the filter head 300 in order to prevent fluid bypass between the interface member 220 and the filter head 300. The sealing member 230 is tilted at an oblique angle 232 (e.g., an angle other than) 90° with respect to the central axis 210 of the filter cartridge 200 such that a cross-section through the sealing member 230 forms an ellipse. For example, the oblique angle 232 may be approximately 75° or within a range between approximately 50°-85°. In other embodiments, the oblique angle 232 may be within different ranges.

As shown in FIG. 6, the first endcap 216 of the filter cartridge 200 includes an upper extension piece 234 and a lower extension piece 236 that each extend radially outward from the cylindrically-shaped protrusion 222. The lower extension piece 236 that is parallel (or substantially parallel) to the upper extension piece 234. The lower extension piece 236 is spaced apart from the upper extension piece 234. Together, the upper extension piece 234 and the lower extension piece 236 form a groove 238 structured (e.g., sized) to receive the sealing member 230 therein. The groove 238 is sized to prevent movement of the sealing member 230 relative to first endcap 216 and the protrusion 222. As shown in FIG. 6, an upper edge 240 of the upper extension piece 234 is approximately coplanar (e.g., flush) with an upper surface 242 (e.g., upper end, upper edge, etc.) of the protrusion 222.

As shown in FIG. 2, rotational alignment between the interface member 220 and the filter head 300 is required in order to ensure a liquid-tight seal is formed between the interface member 220 and the filter head 300. As shown in FIGS. 4-6, the first endcap 216 includes an anti-rotation member 244 structured to engage with the filter head 300 in order to position the sealing member 230 (see also FIG. 2) along the sealing interface 309. The anti-rotation member 244 includes a generally rectangular-shaped tab 246 disposed along an outer surface 248 of the protrusion 222. The tab 246 engages the interface member 220 (e.g., the protrusion 222), and extends radially away from the interface member 220 such that there is no gap between the anti-rotation member 244 and the interface member 220. In some embodiments, the tab 246 is a separate component from the interface member 220 and contacts (e.g., is disposed on) the interface member 220. In the embodiment shown in FIGS. 4-6, the tab 246 is integrally formed with at least one of the interface member 220 or the first endcap 216 as a single unitary body. The tab 246 also extends upwardly from the upper surface 242 in substantially perpendicular orientation relative to the upper surface 242. As shown in FIG. 6, a height 250 of the tab 246 along the outer surface 248 of the protrusion 222 (e.g., parallel to a central axis through the first endcap 216) is approximately the same as a vertical distance 252 between the upper surface 242 and a lowermost end of the lower extension piece 236.

As shown in FIGS. 4-5, the first endcap 216 includes a pair of coupling members 223 that are structured to mechanically connect (e.g., couple, etc.) the first endcap 216 (and the liquid filter cartridge 200) to the shell housing 400. The coupling members 223 are configured to engage with the housing along an upper edge of the shell housing 400. In some embodiments, the coupling members 223 form a portion of a clip, latch, clasp, or another quick connect interface. As shown in FIGS. 4-5, each coupling member 223 is an extension piece that extends radially outward from an outer perimeter of the first endcap 216. In other embodiments, the size, shape, and arrangement of the coupling members 223 may be different.

As shown in FIG. 2, the sealing member 230 is structured to press radially outwardly against a central portion 311 of the filter head 300 to form a seal between the interface member 220 and the filter head 300. The central portion 311 includes a skirt 312 that extends downwardly (e.g., vertically downward as shown in FIG. 2) in substantially parallel orientation relative to the central axis 310 of the filter head 300. The skirt 312 defines a cylindrically-shaped recessed area 314 that is sized to receive the interface member 220 therein (such that the interface member 220 is at least partially surrounded by the skirt 312).

FIGS. 7-10 show perspective, front, side, and rear views, respectively of the central portion 311 of the filter head 300. The central portion 311 may be molded, cast, or otherwise formed from a plastic material (e.g., polypropylene, high density polyethylene, polyvinyl chloride, nylon, etc.), a metal (e.g., aluminum, stainless steel, etc.), or any other suitable material. The skirt 312 includes a ramp 316 disposed at a first, lower end 318 of the skirt 312 and a plurality of seal disruptors, shown as ribs 320 disposed proximate to a second, upper end 322 of the skirt 312. As shown in FIG. 2, the sealing interface 309 is disposed between the ramp 316 and a reference plane 324 passing through a lower edge 326 of each one of the plurality of ribs 320; the reference plane 324 extending parallel to the sealing interface 309 (e.g., parallel to the sealing member 230). As shown in FIGS. 7-10, the ramp 316 is formed in a helical shape that extends parallel to the central axis 310 of the filter head 300. Among other benefits, the helical shape of the ramp 316 prevents a planar radial sealing element from fully engaging the skirt 312 proximate to the lower edge 326 of the skirt 312 (e.g., below the sealing interface 309).

Figure 9:
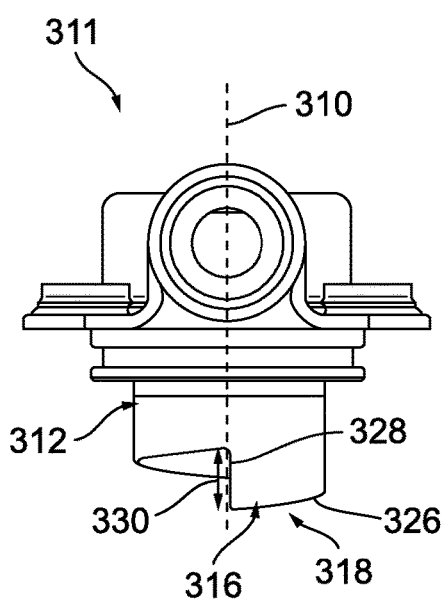
Figure 10:
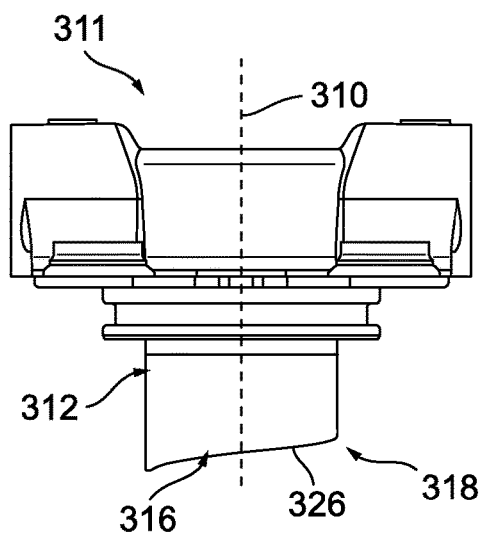

As will be further described, the anti-rotation member 244 (see also FIGS. 4-6) of the first endcap 216 is structured to engage a leading edge 328 of the ramp 316 (e.g., a stepwise transition in a height of the ramp 316) to rotationally position the interface member 220 with respect to the filter head 300 (e.g., to align the sealing member 230 with the sealing interface 309 as shown in FIG. 2). As shown in FIG. 9, a pitch 330 (e.g., a height) of the ramp 316, along the leading edge 328 of the ramp 316, is approximately equal to the height 250 of the anti-rotation member 244 (e.g., the tab 246 shown in FIG. 6) in order to fully accommodate the anti-rotation member 244 during assembly. In other embodiments, the pitch 330 of the ramp 316 is greater than the height 250 of the anti-rotation member 244.

Referring now to FIG. 9, the pitch 330 of the ramp 316 is sized to prevent the anti-rotation member 244 (see also FIG. 6) from engaging the lower edge 308 of the skirt 312 during installation of the shell housing 400 onto the filter head 300 (see FIG. 1). In other words, the pitch 330 of the ramp 316 is sized to prevent the anti-rotation member 244 from contacting the ramp 316 at a circumferential position that is either before or after the leading edge 328 of the ramp 316. In various example embodiments, the pitch 330 of the ramp 316 is greater than a thread pitch of the male threaded portion 410 and the female threaded portion 302 (see also FIG. 1). In the example system 100 of FIG. 1, the pitch 330 of the ramp 316 is equal to an integer multiple of a thread pitch of the male threaded portion 410 and the female threaded portion 302 (e.g., four times the thread pitch, etc.).

As shown in FIG. 2, the skirt 312 includes a first inner surface 332 and a second inner surface 334 extending upwardly from the first inner surface 332 into the recessed area 314 of the skirt 312. The second inner surface 334 forms the sealing interface 309 at which the sealing member 230 engages the skirt 312. The first inner surface 332 at least partially forms an inner surface of the ramp 316. A transition 336 between the first inner surface 332 and the second inner surface 334 is oriented parallel to the sealing member 230. Alternatively, the transition 336 between the first inner surface 332 and the second inner surface 334 can be tilted at an angle with respect to the sealing member 230 (e.g., can be oriented in a slightly non-parallel angle, etc.) such that the seal engagement occurs locally/gradually vs. abruptly over the full seal perimeter, giving a "softer" more user-friendly installation feel, lacking an abrupt step-change in torque required. In the example system 100 of FIG. 2, an inner diameter 337 of the second inner surface 334 is less than an inner diameter 338 of the first inner surface 332. Among other benefits, the difference in (inner) diameter 337, 338 between the first inner surface 332 and the second inner surface 334 prevents damage to the sealing member 230 during assembly (e.g., prevents the sealing member 230 from rubbing against the first inner surface 332 as the sealing member 230 is pressed into the recessed area 314, past the first inner surface 332). The difference in (inner) diameter also prevents non-genuine filter cartridges without the proper structure from sealing against the ramped portion of the skirt 312.

Figure 11:
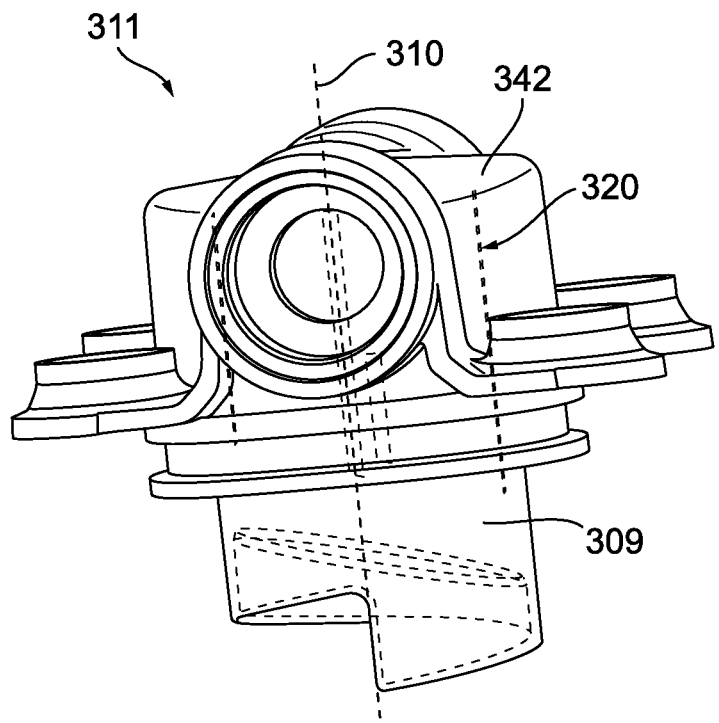
FIG. 11 is a perspective view of the central portion of FIG. 7.
Figure 12:
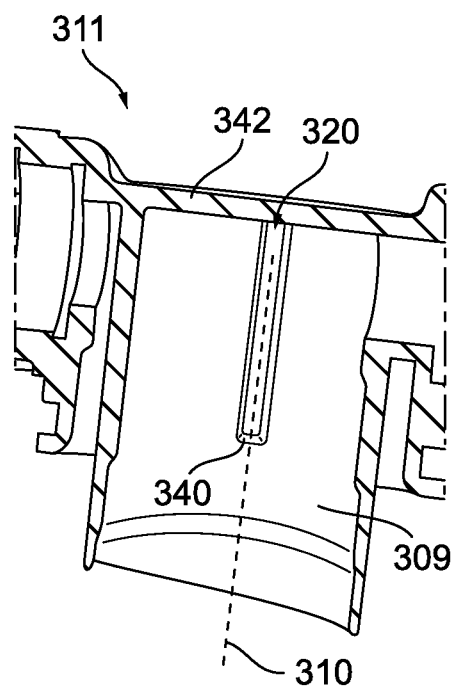
FIG. 12 is a perspective cross-sectional view of the central portion of FIG. 7.

The plurality of ribs 320 (or, alternatively, grooves) are structured to prevent an improper filter cartridge from sealing along a portion of the recessed area 314 that is above the sealing interface 309. In the event that a non-matching, non-genuine filter cartridge without the proper arrangement is installed into the filter head 300, the ribs 320 will press against the seal to displace the seal and allow fluid to bypass between the clean and dirty sides of the filter cartridge. In an alternative example, the ribs 320 could be replaced by indentations or grooves. The indentations or grooves would prevent proper sealing engagement between the non-matching, non-genuine filter cartridge and the filter head 300, despite being fully installed (e.g., axially) into the filter head 300. FIGS. 11-12 show perspective and cross-sectional views, respectively of the central portion 311 of the filter head 300. Each one of the plurality of ribs 320 includes a raised thin section of material extending upwardly (e.g., vertically upwardly as shown in FIGS. 11-12) from an upper edge 340 of the sealing interface 309, between the upper edge 340 and an upper wall 342 of the central portion 311. The ribs 320 are oriented parallel to the central axis 310 of the filter head 300. In other embodiments, the shape, number, and orientation of the ribs 320 may be different. In various example embodiments, the ribs 320 are integrally formed with the central portion 311 of the filter head 300 as a single unitary structure.

Referring now to FIG. 3, the second endcap 218 of the filter cartridge 200 is detachably (e.g., removably) coupled to a lower wall 406 of the shell housing 400 via interlocking members disposed on the second endcap 218 and the lower wall 406. The interlocking members prevent axial movement of the filter cartridge 200 relative to the shell housing 400, while allowing the filter cartridge 200 to rotate under torsional loading relative to the shell housing 400 (e.g., relative to the central axis 404 of the shell housing 400).

Figure 13:
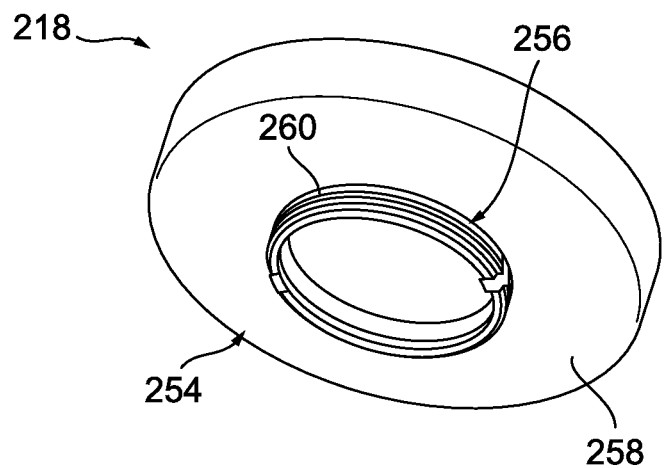
FIG. 13 is a perspective view of a second endcap of a filter cartridge used in the liquid filtration system of FIG. 1.
Figure 14:
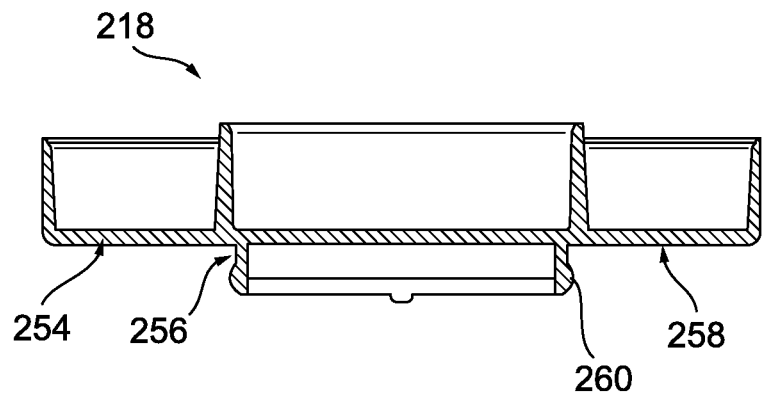
FIG. 14 is a side cross-sectional view of the second endcap of FIG. 13.

FIGS. 13-14 show perspective and side views, respectively of the second endcap 218. Similar to the first endcap 216 of FIGS. 4-6, the second endcap 218 of FIGS. 13-14 includes a base 254 that is structured to couple to the filter pack 202 (at a second end 214 of the filter pack 202 as shown in FIG. 1). The second endcap 218 includes a male interlocking member 256 extending from a lower surface 258 of the second endcap 218 in substantially perpendicular orientation relative to the lower surface 258. The male interlocking member 256 includes a lip 260 (e.g., protrusion, ledge, etc.) extending circumferentially along an outer perimeter of the male interlocking member 256. As shown in FIG. 3, the male interlocking member 256 is structured to engage with a female interlocking member 418 disposed on the lower wall 406 of the shell housing 400.

Figure 15:
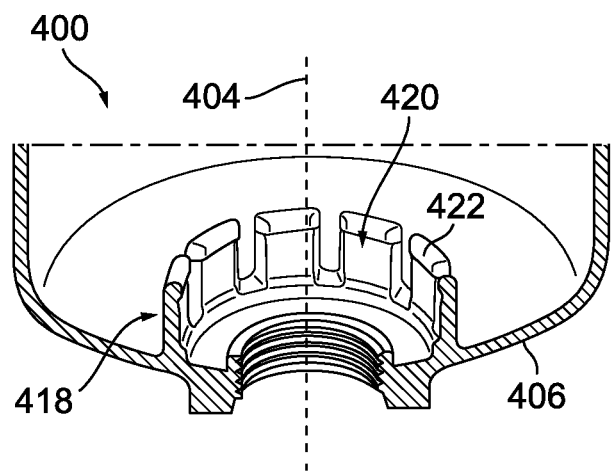
FIG. 15 is a perspective cross-sectional view of a lower portion of a shell housing used in the liquid filtration system of FIG. 1.
Figure 17:
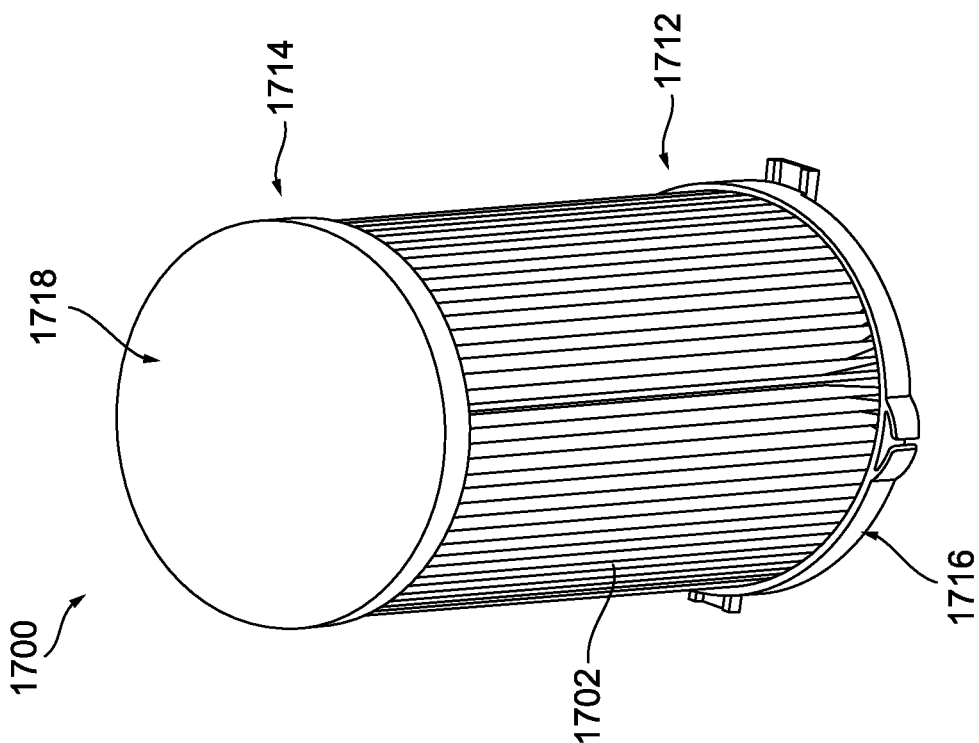
FIG. 17 is a bottom perspective view of the filter cartridge of FIG. 16.
Figure 16:
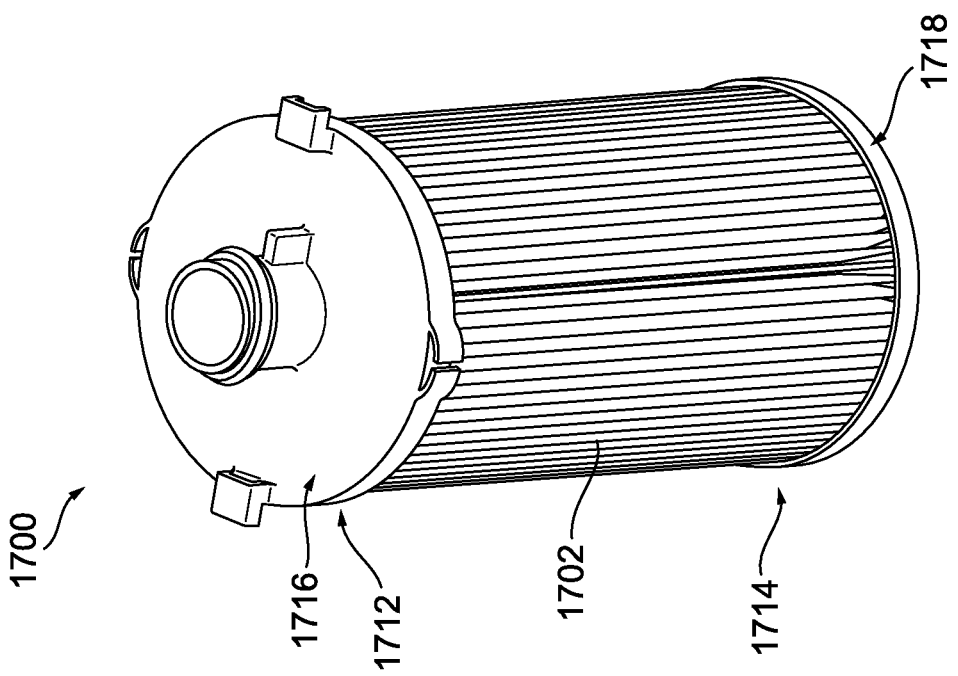
FIG. 16 is a top perspective view of another example filter cartridge.

FIG. 15 shows a perspective cross-sectional view of the shell housing 400 near the lower wall 406. The female interlocking member 418 includes a plurality of fingers 420 that extend upwardly (e.g., vertically upwardly as shown in FIG. 15) from the lower wall 406 in substantially perpendicular orientation relative to the lower wall 406. Each one of the fingers 420 includes an inner latch 422 structured to engage with the lip 260 on the male interlocking member 256 (see also FIGS. 13-14). The inner latch 422 retains the lip 260, thereby securing the filter cartridge 200 in position (e.g., axially) relative to the shell housing 400. In the example embodiment of FIG. 15, the fingers 420 are structured to deform (e.g., bend, flex) outwardly (e.g., radially outward relative to the central axis 404 of the shell housing 400) in response to an applied force from the male interlocking member 256. In this way, the female interlocking member 418 snaps (e.g., clicks, hooks, etc.) over the lip 260 on the male interlocking member 256 to secure the filter cartridge 200 in position. The frictional force between the male interlocking member 256 and the female interlocking member 418 prevents rotation of the filter cartridge 200 relative to the shell housing 400 in the absence of an applied torque between the filter cartridge 200 and the shell housing 400. Among other benefits, as shown in FIG. 2, the male interlocking member 256 and the female interlocking member 418 align the central axis 210 of the filter cartridge 200 with the central axis 404 of the shell housing 400 and position the filter cartridge 200 relative to the filter head 300 during assembly.

The combination of features shown in the example system 100 of FIGS. 1-15 should not be considered limiting, and a variety of alternatives are possible without departing from the inventive concepts disclosed herein. For example, FIGS. 16-20 show another example filter cartridge 1700 that is similar to the filter cartridge 200 of FIG. 1. The filter cartridge 1700 includes a first endcap 1716 coupled to a first end 1712 of the filter pack 1702 and a second endcap 1718 coupled to a second end 1714 of the filter pack 1702. The second endcap 1718 is a cup shaped plate that defines a substantially planar surface that covers the second end 1714.

Figure 18:
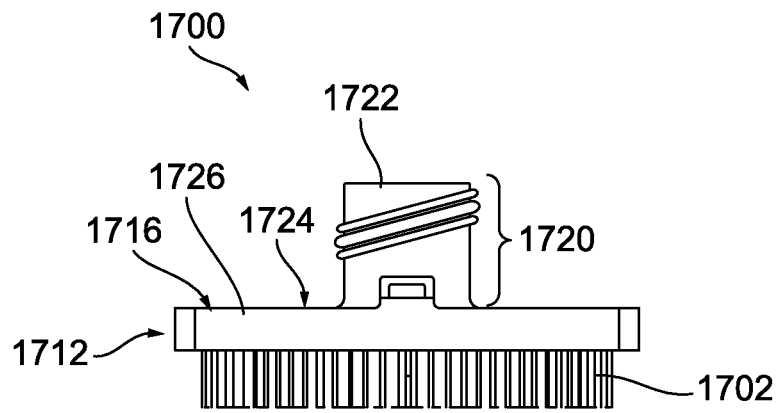
FIG. 18 is a side view of a first endcap portion of the filter cartridge of FIG. 16.
Figure 19:
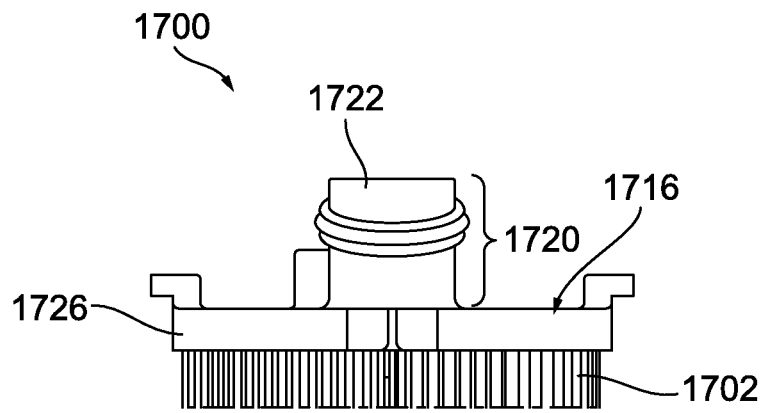
FIG. 19 is another side view of the first endcap portion of the filter cartridge of FIG. 16.
Figure 20:
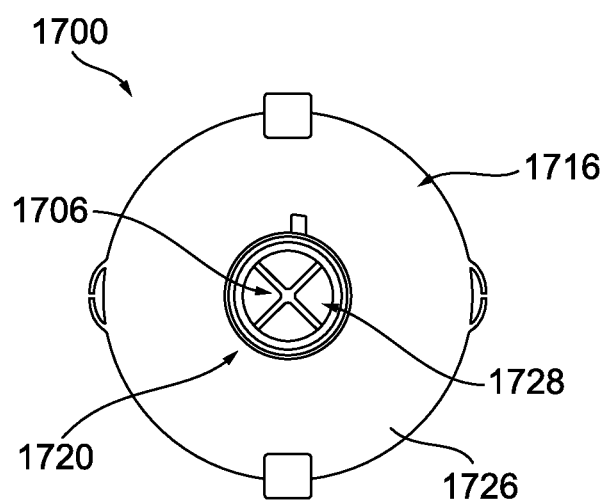
FIG. 20 is a top view of the filter cartridge of FIG. 16.

As shown in FIGS. 18-20, the first endcap 1716 includes an interface member 1720 that is configured to sealingly engage the filter cartridge 1700 to a filter head. The interface member 1720 includes a generally cylindrically-shaped protrusion 1722 extending from an upper surface 1724 of a base 1726 of the first endcap 1716. The protrusion 1722 extends upwardly (e.g., vertically upwards as shown in FIG. 18) from the upper surface 1724 in substantially perpendicular orientation relative to the upper surface 1724. The protrusion 1722 defines a central opening, shown as through-hole 1728 (see FIG. 20) that extends through the first endcap 1716. As shown in FIG. 20, the through-hole 1728 is axially aligned (in coaxial arrangement) with the central opening 1706 of the filter cartridge 1700.

Figure 21:
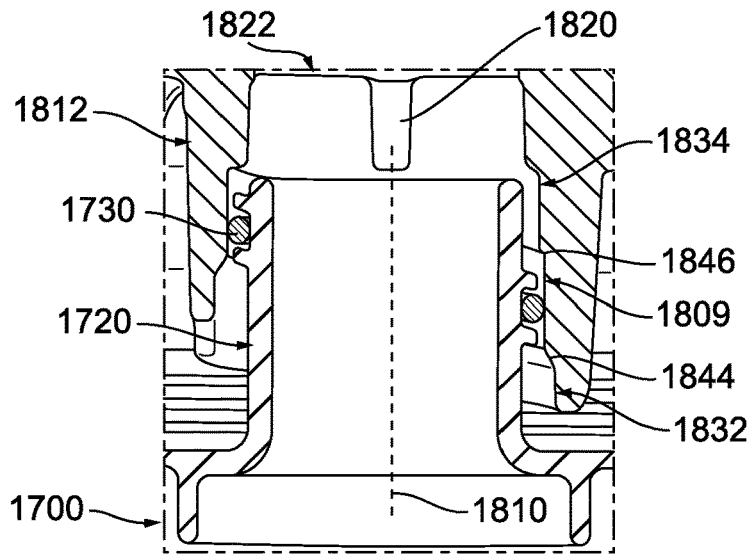
FIG. 21 is a side cross-sectional view of a first endcap portion of the filter cartridge of FIG. 16 engaged with a filter head.
Figure 22:
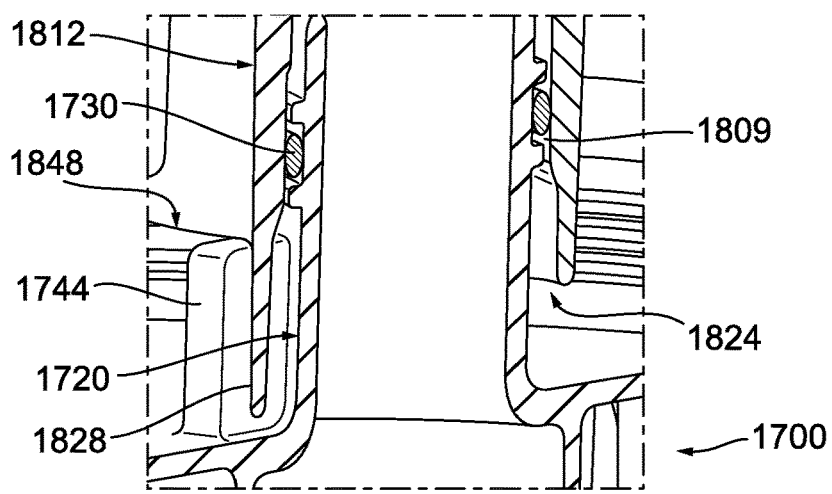
FIG. 22 is another cross-sectional view of the first endcap portion of the filter cartridge of FIG. 16 engaged with a filter head.
Figure 23:
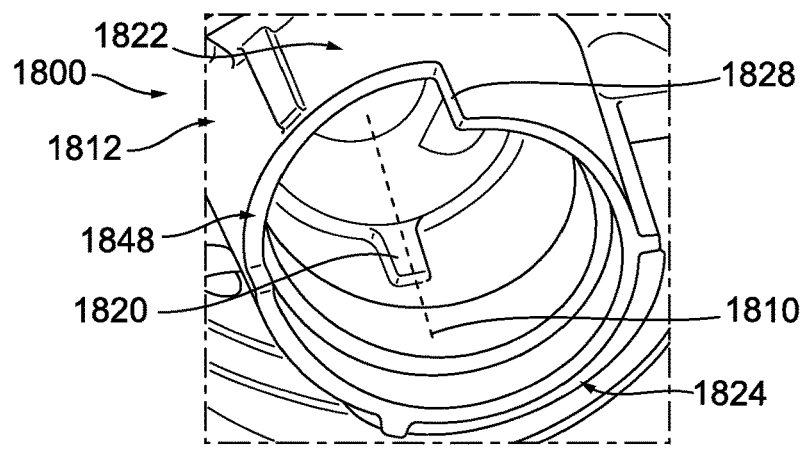
FIG. 23 is a perspective view of a skirt portion of a filter head.

FIGS. 21-23 show the interface member 1720 engaged with a skirt 1812 of a filter head 1800. In particular, the interface member 1720 includes a sealing member 1730 that is sealingly engaged with the skirt 1812 along an angled sealing interface 1809. As shown in FIGS. 21 and 23, the skirt 1812 includes a plurality of ribs 1820 disposed proximate to an upper end 1822 of the skirt 1812. Each of the ribs 1820 extends downwardly from the upper end 1822 in substantially parallel orientation relative to a central axis 1810 of the skirt 1812. A height of each of the ribs 1820 is approximately uniform along the circumference of the skirt 1812. In other embodiments, the height of each of the ribs 1820 may be different (e.g., a lower end of each of the ribs 1820 may extend to the upper edge of the angled sealing interface 1809). As shown in FIG. 21, the angled sealing interface 1809 separates a lower inner surface 1832 of the skirt 1812 from an upper inner surface 1834. The lower inner surface 1832 is spaced apart from the upper end 1822 by the upper inner surface 1834 and the angled sealing interface 1809. As shown in FIG. 21, an inner diameter of the skirt decreases at a first transition 1844 between the lower inner surface 1832 and the angled sealing interface 1809, and also at a second transition 1846 between the angled sealing interface 1809 and the upper inner surface 1834. As shown in FIG. 21, the change in diameter at the first transition 1844 is gradual to facilitate installation of the filter cartridge 1700 (e.g., interface member 1720) into the skirt 1812.

As shown in FIG. 22, the interface member 1720 also includes an anti-rotation member (e.g., tab) 1744, which may be the same as or similar to the anti-rotation member 244 described with reference to FIG. 6. As shown in FIGS. 22-23, the anti-rotation member 1744 is sized to engage with a slot 1848 that is disposed in a lower end 1824 of the skirt 1812. Among other benefits, incorporating the slot 1848 into the skirt 1812 helps facilitate alignment between the filter cartridge 200 and the filter head 1800 during installation. As shown in FIG. 22, the anti-rotation member 1744 engages with trailing edge 1828 of the slot 1848 during installation to fully align the interface member 1720 with the angled sealing interface 1809 (and to substantially prevent further rotation of the filter cartridge 1700).

Figure 24:
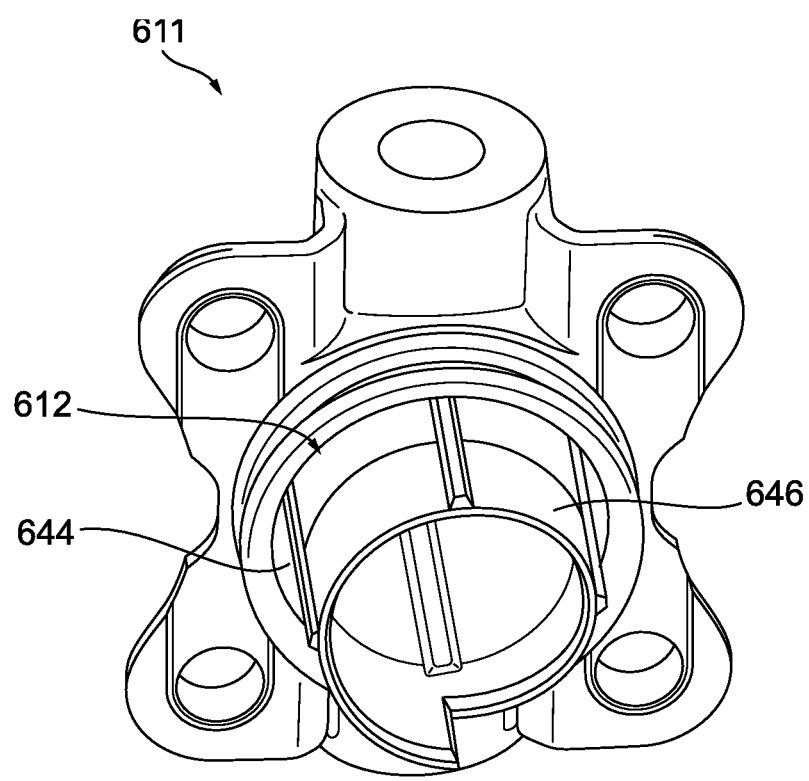
FIG. 24 is a perspective view of a central portion of a filter head for another example liquid filtration system.

FIG. 24 shows a central portion 611 of another example filter head. The central portion 611 includes a skirt 612, which may be the same or similar to the skirt 312 described with reference to FIGS. 7-12. Additionally, the skirt 612 of FIG. 24 includes a plurality of seal disruptors, shown as outer ribs 644, disposed on an outer surface 646 of the skirt 612 and arranged in substantially parallel orientation relative to a central axis of the skirt 612. The outer ribs 644 extend along a length of the skirt 612 from an upper end of the skirt 612 to a lower end of the skirt 612. Among other benefits, the outer ribs 644 prevent a non-matching, non-genuine filter element from sealing against the outer surface 646 (e.g., the outer ribs 644 prevent a radial sealing member of a non-genuine filter element from fully contacting the outer surface 646). Alternatively, the ribs 644 could be replaced by indentations or grooves to prevent non-matching, non-genuine filter element from sealing against the outer surface 646.

FIGS. 25-27 show a filter head 701 for another liquid filtration system 700. The filter head 701 includes a skirt 712 that is integrally formed with the filter head 701 as a single unitary structure. The sealing surfaces and ribs (e.g., ramp 716, inner ribs 720, outer ribs 744, etc.) are also integrally formed with the filter head 701 as opposed to including them as part of a separate cap or adapter.

Figure 28:
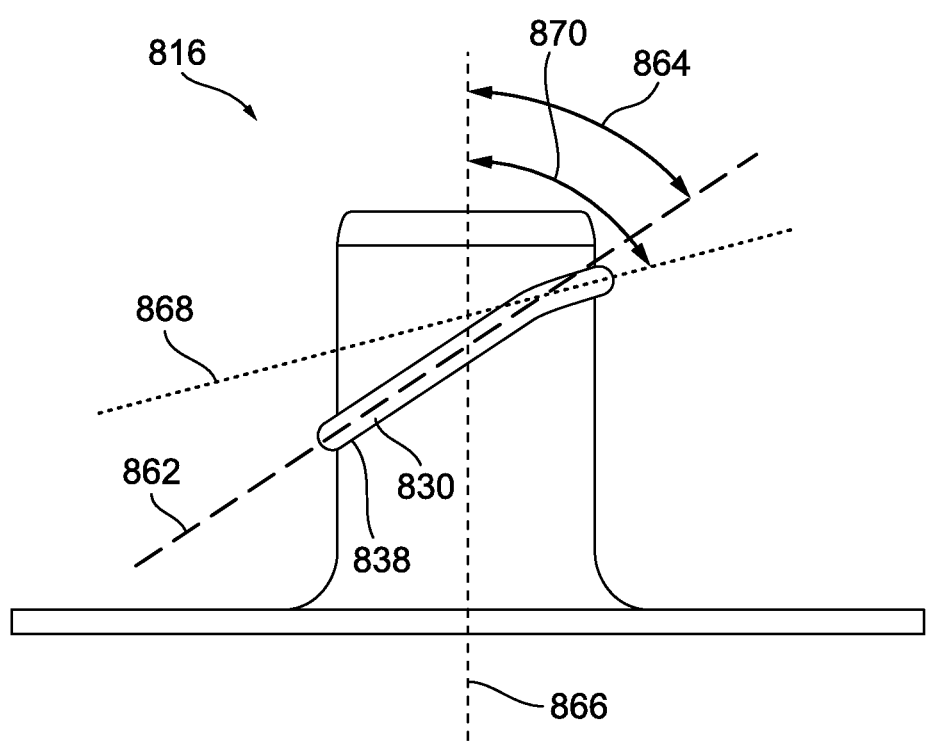
FIG. 28 is a side view of a first endcap of a filter element for yet another example liquid filtration system.

FIG. 28 shows another example first endcap 816 of a filter cartridge (e.g., the filter cartridge 200 of FIG. 1). The first endcap 816 is structured to support a sealing member 830 in a non-planar orientation. The first endcap 816 includes a groove 838. A first portion of the groove 838 is disposed along a first reference plane 862. The first reference plane 862 forms a first angle 864 with respect to a central axis 866 through the first endcap 816. A second portion of the groove 838 is disposed along a second reference plane 868. The second reference plane 868 forms a second angle 870 with respect to the central axis 866. In the embodiment of FIG. 28, the second angle 870 is greater than the first angle 864. In other embodiments, the geometry of the groove 838 may be different and could include non-planar shapes such as parabolic hyperboloid seal shapes or simple curved shapes. In embodiments where the groove 838 is non-planar (e.g., tilted at multiple angles, curved, etc.), the sealing member is at least partially tiled at an oblique angle with respect to a central axis of the filter cartridge.

In some embodiments, the filter cartridge may be structured to engage with the filter head along an axial sealing interface or a combination of an axial sealing interface and a radial sealing interface. Referring to FIGS. 29-31, a system 900 is shown to include a sealing member 930 that is sealingly engaged to a skirt 912 along a lower edge 913 of the skirt 912. The sealing member 930 forms an axial seal (e.g., an end-to-end sealing arrangement) with the skirt 912. As shown in FIG. 31, a first endcap 916 of a filter cartridge for the system 900 includes an axial groove 915 structured (e.g., sized) to receive the sealing member 930 therein. The sealing member 930 is an irregular shape having non-uniform cross-sections normal to a central axis of the first endcap 916. As shown in FIG. 30, a height 917 of the sealing member 930, parallel to the central axis of the first endcap 916, varies with position along the axial groove 915.

Figure 33:
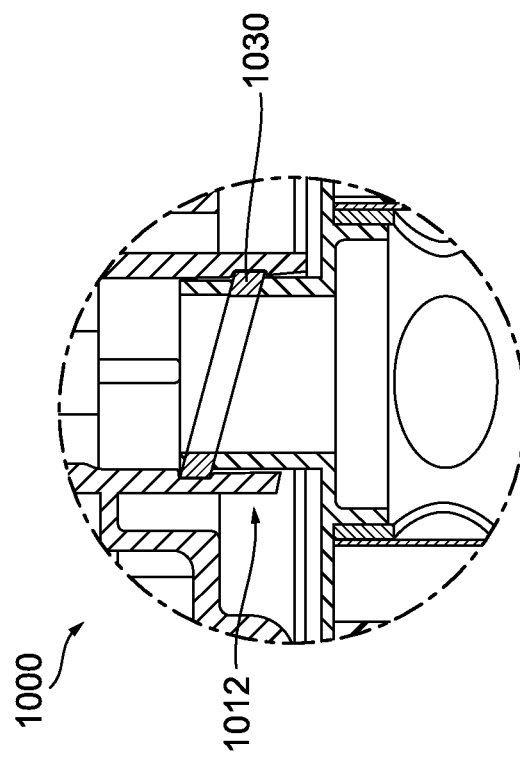
FIG. 33 is a reproduction of FIG. 32 near a sealing interface.
Figure 34:
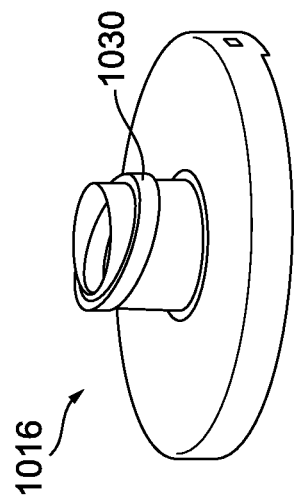
FIG. 34 is a perspective view of a first endcap of a filter element for the liquid filtration system of FIG. 32.
Figure 32:
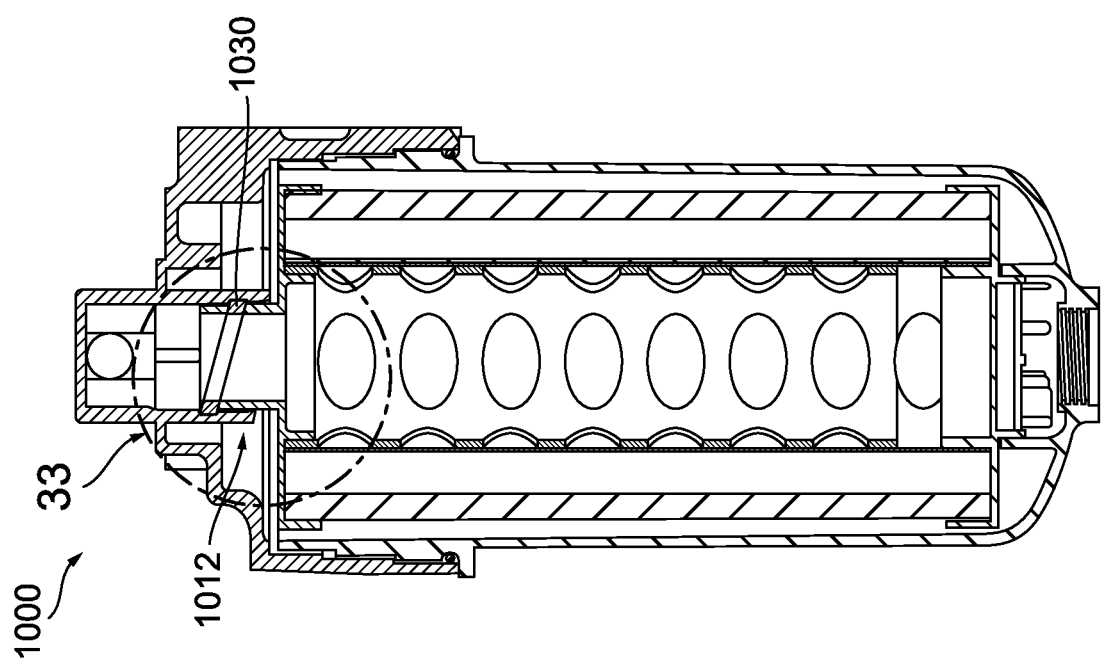
FIG. 32 is a side cross-sectional view of another liquid filtration system.

Other types of sealing members are also contemplated. For example, FIGS. 32-34 show a system 1000 that includes a radial sealing member 1030 structured to sealingly engage a filter cartridge to a skirt 1012 along an inner surface of the skirt 1012 (e.g., in a radial sealing configuration). As shown in FIGS. 33-34, the sealing member 1030 has a substantially rectangular cross-section. The sealing member 1030 may be over molded onto a first endcap 1016 of the filter cartridge, or may be a simple cut-gasket installed in rectangular elliptical groove. In other embodiments, the geometry and/or arrangement of the sealing member 1030 may be different.

Figure 35:
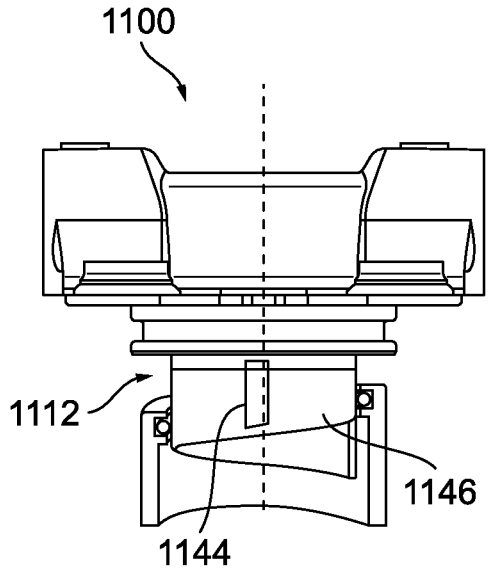
FIGS. 35-37 are side views of a central portion of a filter head for another liquid filtration system.
Figure 36:
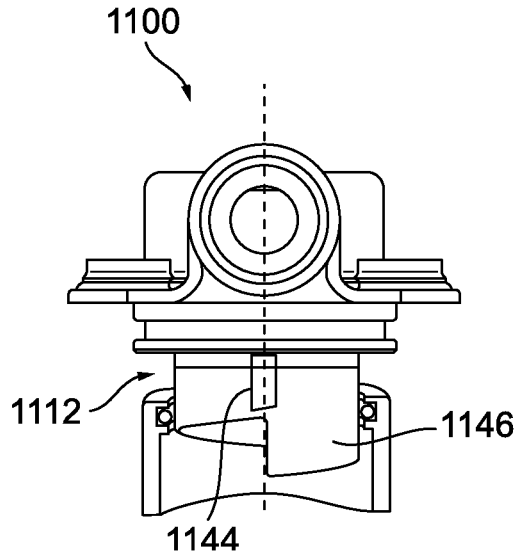
Figure 37:
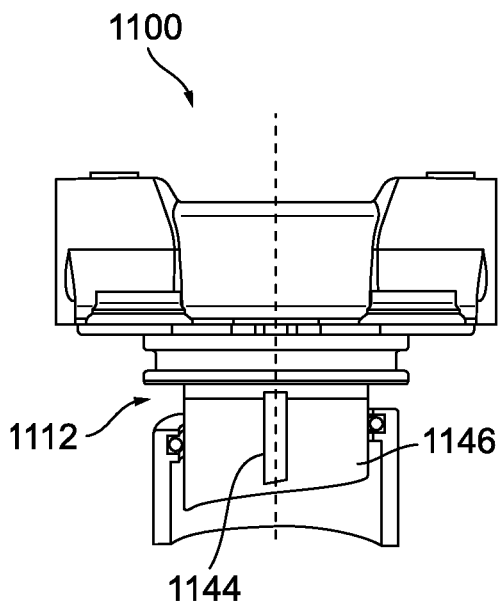
Figure 38:
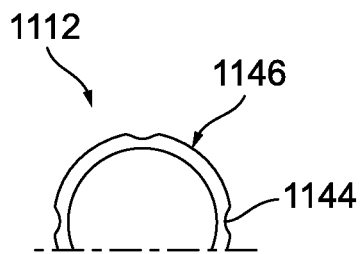
FIG. 38 is a top cross-sectional view through a skirt of the central portion of FIGS. 35-37.

FIGS. 35-37 show side views another example filter head 1101 where a sealing member is structured to seal against an outer surface 1146 of skirt 1112 rather than an inner surface. As shown, the filter head 1101 includes a plurality of indentations 1144 disposed on an outer surface 1146 of the skirt 1112 and arranged in substantially parallel orientation relative to a central axis of the skirt 1112. The indentations 1144 extend along a length of the skirt 1112 from an upper end of the skirt 1112 to a lower end of the skirt 1112. FIG. 38 shows a top view at a cross-section through the skirt 1112. The indentations 1144 may be cut or otherwise formed into the outer surface 1146. Among other benefits, the indentations 1144 prevent a non-matching, non-genuine filter element from sealing against the outer surface 1146 (e.g., the indentations 1144 prevent a radial sealing member of a non-genuine filter element from fully contacting the outer surface 1146).

Figure 40:
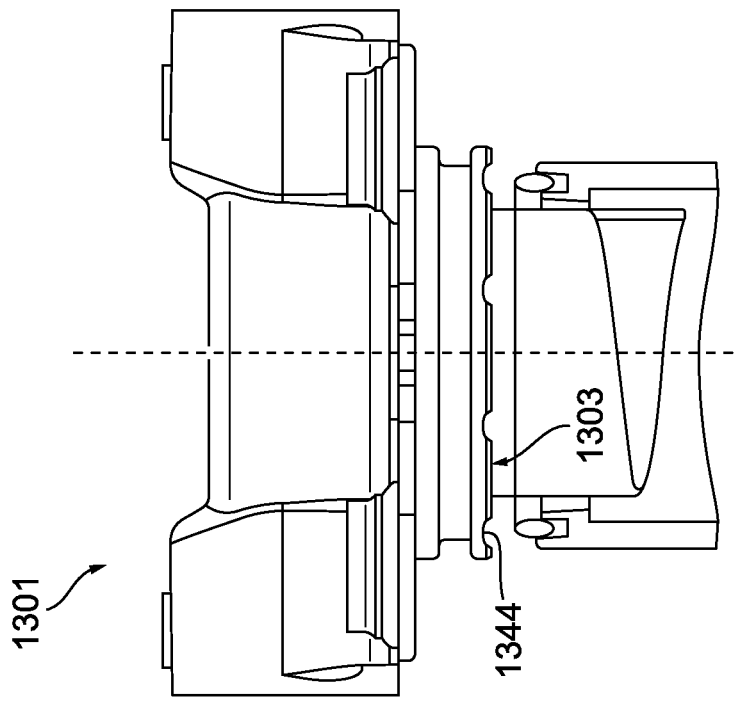
FIG. 40 is a central portion of a filter head for yet another liquid filtration system.
Figure 39:
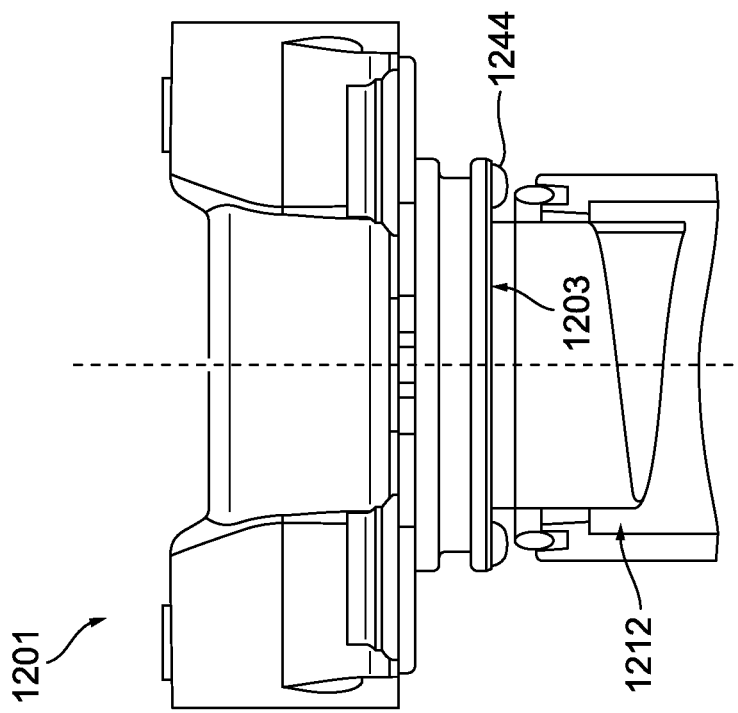
FIG. 39 is a central portion of a filter head for another liquid filtration system.

Similar features may be formed into the filter head to prevent a non-matching, non-genuine filter element from forming an axial seal with the filter head (e.g., to prevent an axial sealing member from fully contacting a surface of the filter head). FIG. 39 shows a side view of an example filter head 1201 that includes a plurality of bumps 1244 disposed on a lower surface 1203 of the filter head 1201 just above a skirt 1212 of the filter head 1201. FIG. 40 shows a side view of an example filter head 1301 that includes a plurality of indentations 1344 on a lower surface 1303 of the filter head 1301.

Figure 41:
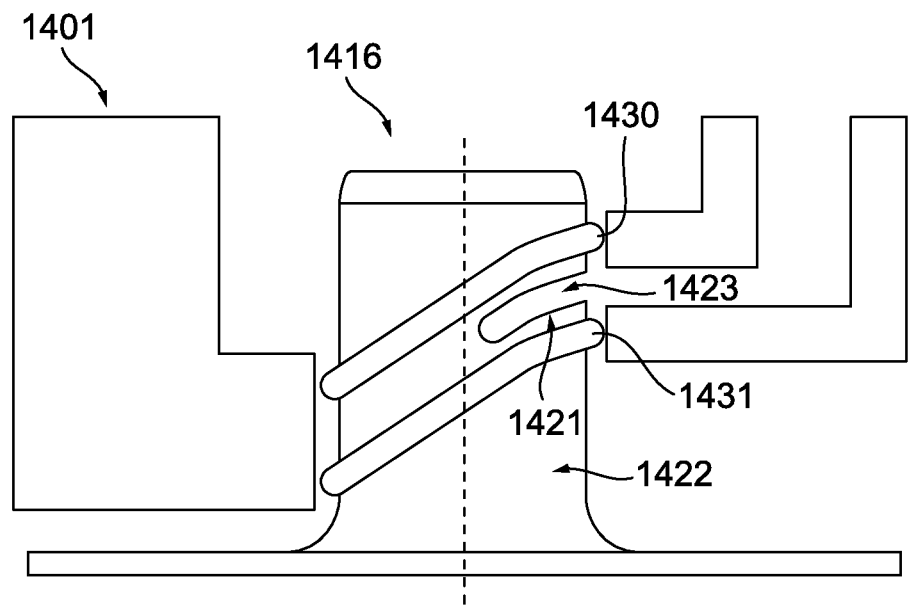
FIG. 41 is a side view of a first endcap of a filter element for another liquid filtration system.
Figure 42:
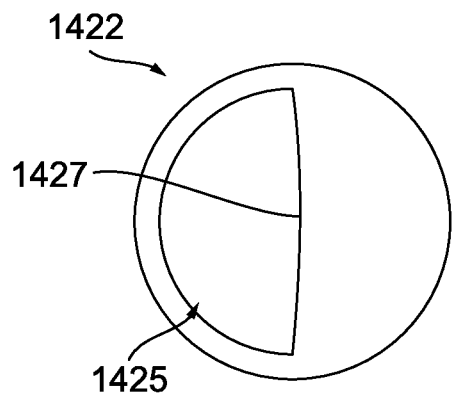
FIG. 42 is a top view of the first endcap of FIG. 41.

In some embodiments, the first endcap of the fuel filter element may be modified to function as both an inlet and an outlet to the hollow portion of the shell housing. FIGS. 41 and 42 show side and top views, respectively, of a first endcap 1416 of a filter element. The first endcap 1416 includes a cylindrically-shaped protrusion 1422. The protrusion 1422 includes an upper sealing member 1430 and a lower sealing member 1431. The lower sealing member 1431 is spaced apart from the upper sealing member 1430 vertically, along a central axis of the first endcap 1416. The protrusion 1422 additionally includes an opening 1421 extending through an outer wall of the protrusion 1422 along an approximately 180° portion of the outer wall. As shown in FIG. 42, the protrusion 1422 additionally includes a partition 1427 defining two passageways through the protrusion 1422 (e.g., an inlet passageway that directs fuel into the hollow portion of the shell and an outlet passageway that directs fuel out from the hollow portion). As shown in FIG. 41, a filter head 1401 is structured to engage with the protrusion 1422 to direct flow to at one of the passageways (e.g., passageway 1423) and to receive flow from the remaining passageway (e.g., passageway 1425).

Figure 43:
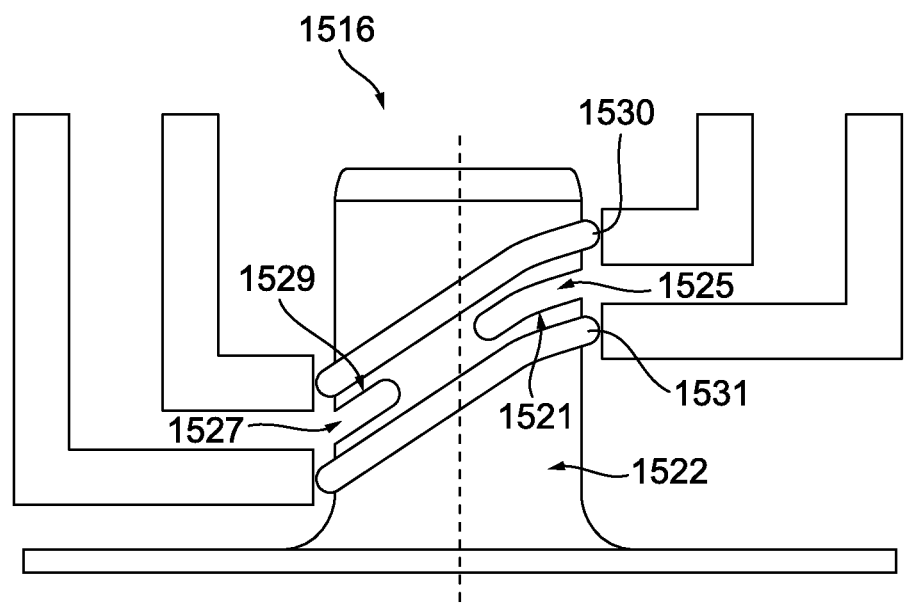
FIG. 43 is a side view of a first endcap of a filter element for another liquid filtration system.
Figure 44:
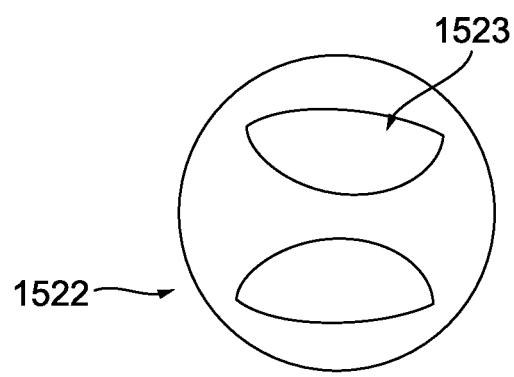
FIG. 44 is a top view of the first endcap of FIG. 43.

FIGS. 43 and 44 show side and top views, respectively, of another example first endcap 1516. Like the first endcap 1416 of FIGS. 41-42, the first endcap 1516 of FIGS. 43-44 includes a protrusion 1522 including an upper sealing member 1530 and a lower sealing member 1531 spaced vertically apart from the upper sealing member 1530. In the embodiment of FIGS. 43-44, the protrusion 1522 defines three passageways, a first passageway 1523 extending through an upper surface of the protrusion 1522, a second passageway 1525 extending through a first opening 1521, and a third passageway 1527 extending through a second opening 1529 on an opposite side of the protrusion 1522 as the first opening 1521. In some implementations, the second passageway 1525 and the third passageway 1527 may be fluidly coupled. In other embodiments, the number and/or geometry of the fluid passageways may be different.

Figure 45:
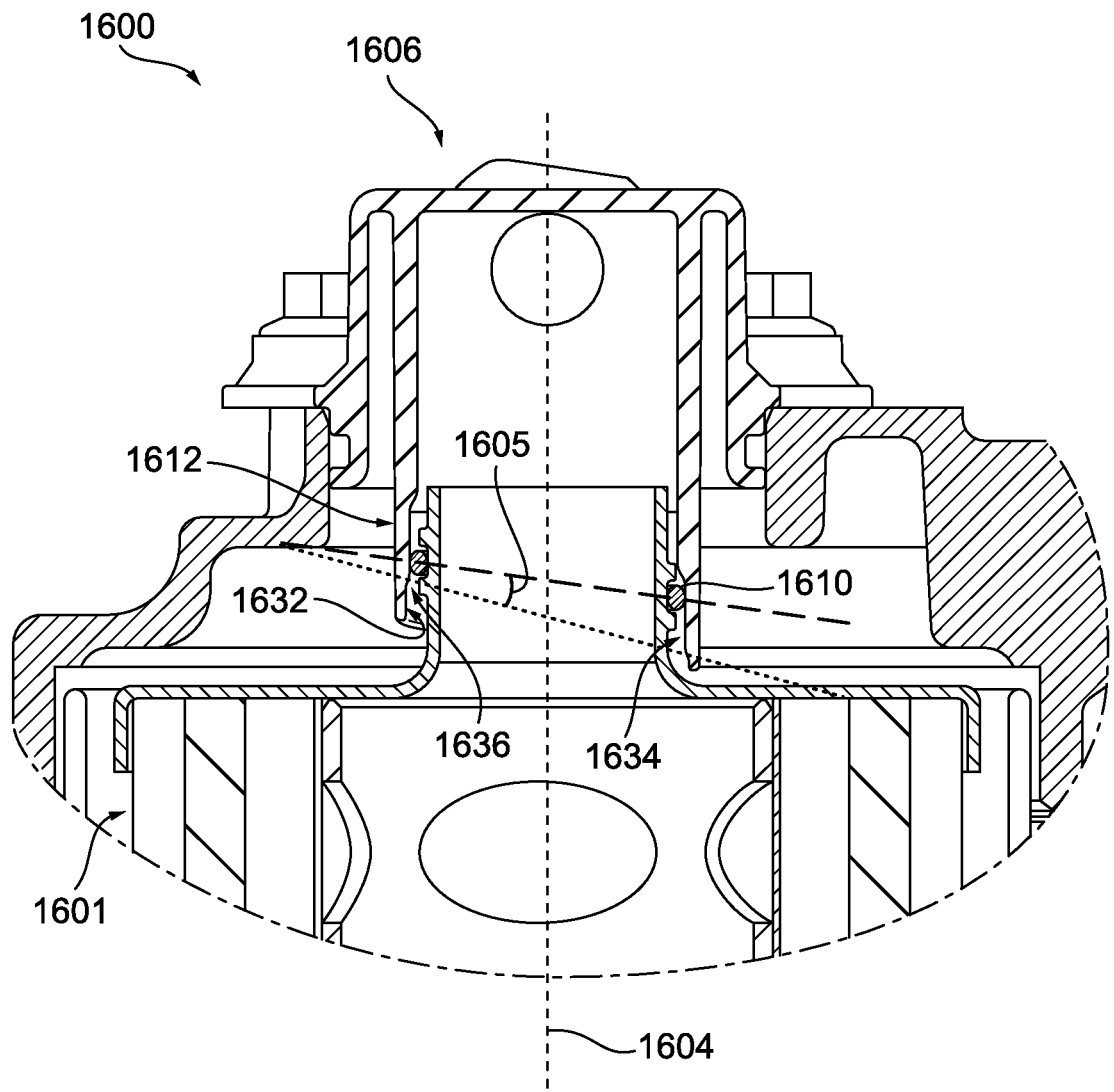
FIG. 45 is a side cross-sectional view of another example liquid filtration system.

FIG. 45 shows a system 1600 in which a transition 1636 between a first inner surface 1632 of a skirt 1612 (below the transition 1636) and a second inner surface 1634 of the skirt 1612 (above the transition 1636) is tilted at an angle 1605 with respect to a sealing member 1610 of the filter cartridge. Among other benefits, tilting the transition 1636 relative to the sealing member 1610 ensures that engagement between the sealing member 1610 and a sealing interface of the skirt 1612 occurs gradually over a perimeter of the sealing interface (rather than abruptly all along the perimeter which would require a much larger force to overcome). In the example embodiment of FIG. 45, the angle 1605 between the transition 1636 and the sealing member 1610 is approximately 10°. In other embodiments, the oblique angle 1602 may be less than or equal to 10° relative to the sealing member 1610 or any other suitable angle to avoid an abrupt change in the compressive force acting between the skirt 1612 and the sealing member 1610 as the filter cartridge 1601 is inserted into the skirt 1612.

I. Example Manufacturing Method for the Example Axial Flow Element

Figure 46:
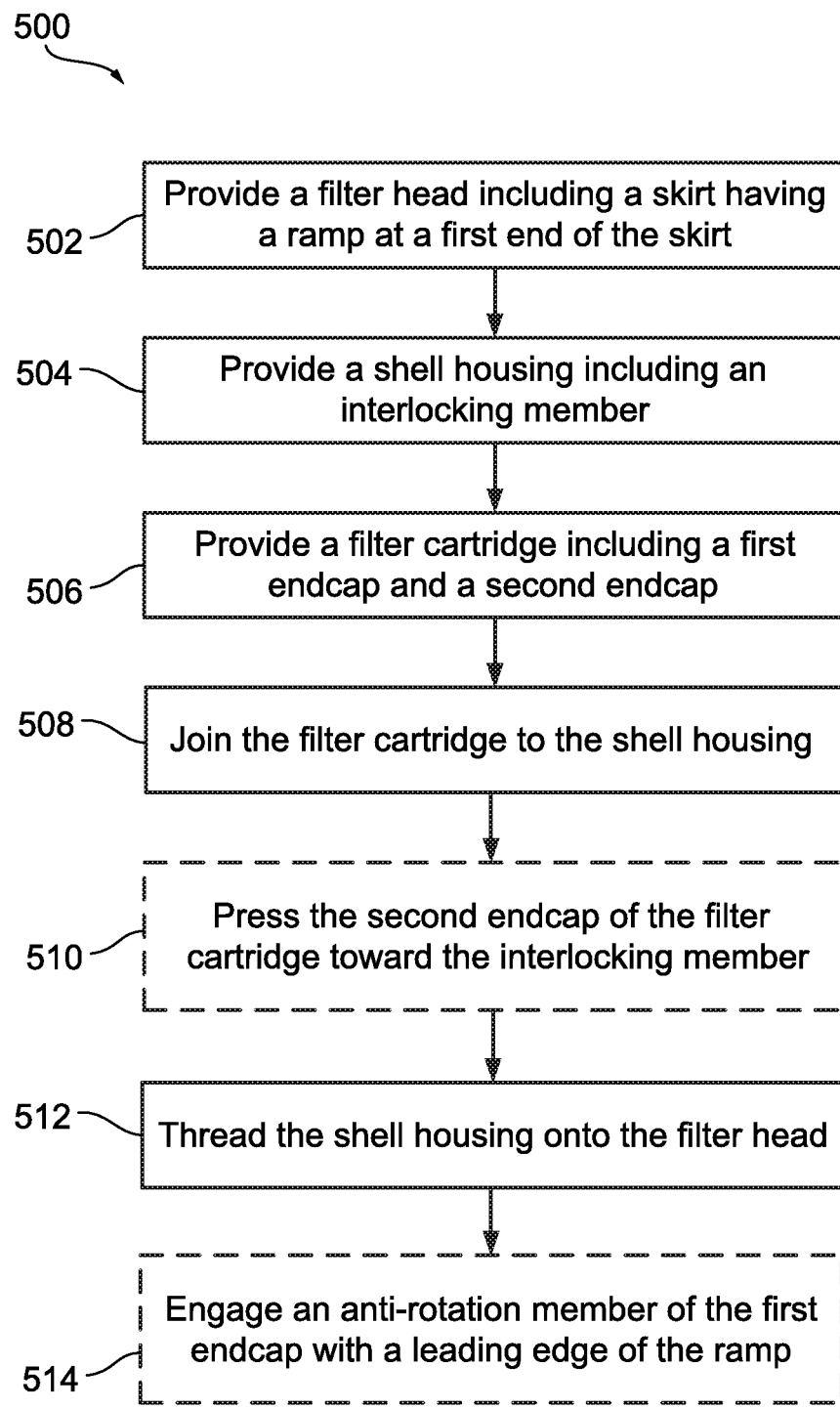
FIG. 46 is a flow diagram of a method of installing a filter cartridge into a liquid filtration system.

FIG. 46 is a flow diagram of a method 500 of installing a filter cartridge in a liquid filtration system. The liquid filtration system may be the same or similar to the system 100 described in detail with reference to FIG. 1. At 502, a filter head 300 is provided. Block 502 may include mounting the filter head 300 to an engine (e.g., an engine block) or to another location along a vehicle chassis (e.g., a frame rail, etc.). Block 502 may additionally include connecting fluid transfer lines to inlet and outlet ports on the central portion 311 of the filter head 300 in order to fluidly couple the filter head 300 to a fuel system.

At 504-506, a shell housing 400 and a filter cartridge 200 are provided. At 508, the filter cartridge 200 is joined to the shell housing 400. Block 508 may additionally include aligning a central axis 210 of the filter cartridge 200 with a central axis 404 of the shell housing 400 and placing the filter cartridge 200 into a hollow portion 402 of the shell housing 400. Block 508 may further include coupling the filter cartridge 200 to the shell housing 400 (e.g., so that the filter cartridge 200 may rotate relative to the shell housing 400); for example, by connecting male interlocking member 256 and the female interlocking member 418 disposed on the filter cartridge 200 and the shell housing 400. The male interlocking member 256 and the female interlocking member 418 may be connected by pressing a second endcap 218 of the filter cartridge 200 (e.g., a male interlocking member 256 of the second endcap 218) toward a female interlocking member 418 on the shell housing 400 (at 510). Block 510 may additionally include expanding the female interlocking member 418 to snap, clip, or otherwise fasten the male interlocking member 256 to the female interlocking member 418.

Figure 47:
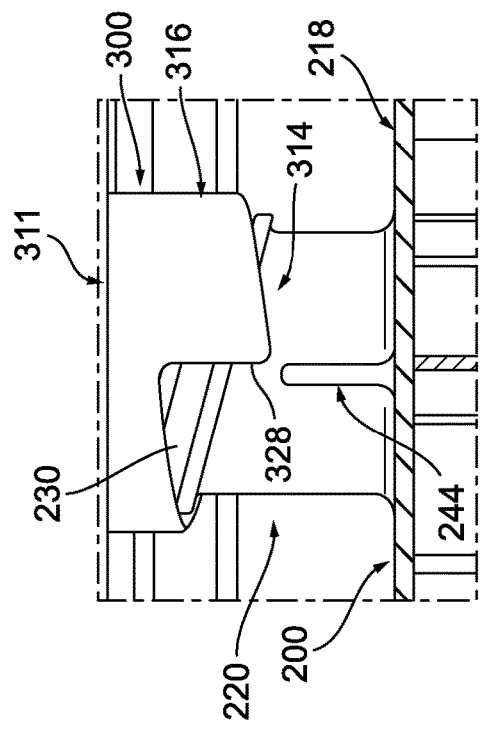
Figure 50:
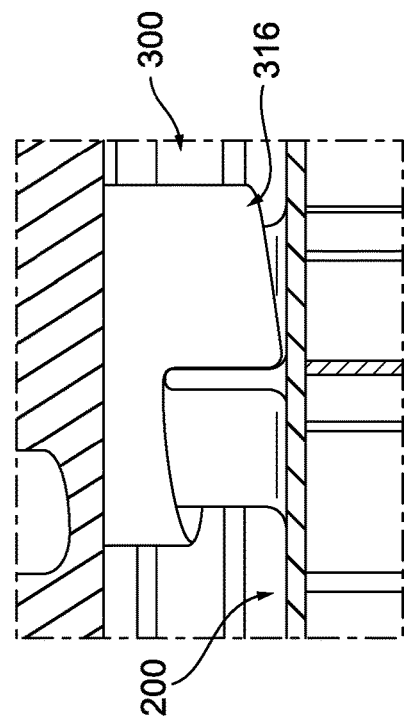

At 512, the shell housing 400 is threaded onto the filter head 300. Block 512 may additionally include aligning the central axis 404 of the shell housing 400 with a central axis 310 of the filter head 300 such that the filter cartridge 200 and the shell housing 400 are in coaxial arrangement with respect to the filter head 300. FIGS. 47-50 show side views of an interface between the filter cartridge 200 and the filter head 300 during block 512 (e.g., the threading operation). As shown in FIG. 47, the interface member 220 of the second endcap 218 is inserted into the recessed area 314 in the central portion 311 of the filter head 300. The shell housing 400 (not shown) is rotated relative to the filter head 300 (e.g., in a clockwise direction relative to the filter head 300) to draw the interface member 220 further into the recessed area 314.

Figure 48:
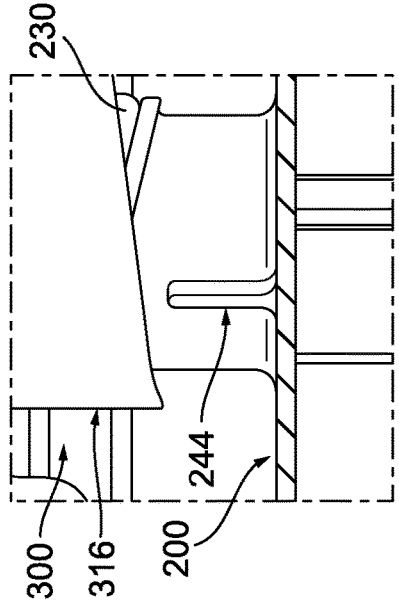
FIGS. 47-50 are side views of a filter cartridge at different rotational positions with respect to a filter head.
Figure 49:
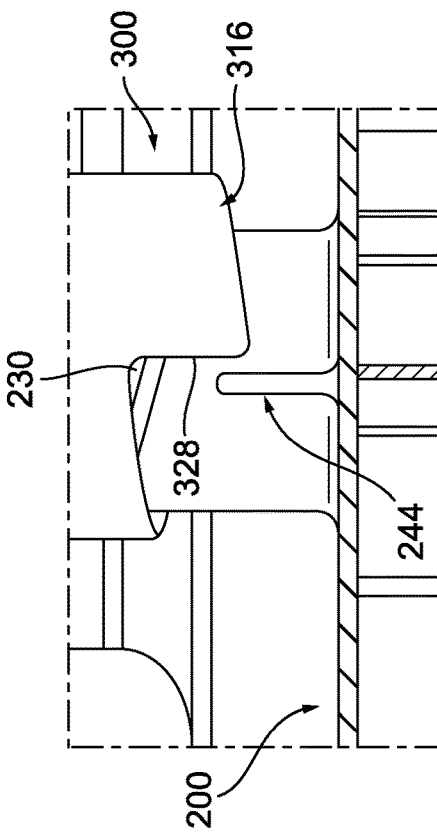

Block 512 may further include engaging an anti-rotation member 244 disposed on the filter cartridge 200 with the leading edge 328 of the ramp 316 on the filter head 300. As shown in FIGS. 47-49, the filter cartridge 200 rotates relative to the filter head 300 under the frictional force between the male interlocking member 256 and the female interlocking member 418 of the filter cartridge 200 and the shell housing 400. As a result of the difference in pitch 330 between the ramp 316 and the threads, the filter cartridge 200 continues to rotate with the shell housing 400 until the anti-rotation member 244 is brought into contact with the leading edge 328 of the ramp 316 (see FIG. 49). The engagement between the anti-rotation member 244 and the ramp 316 ensures that the sealing member 230 will remained aligned with the sealing interface 309 of the filter head 300 as the shell housing 400 is tightened onto the filter head 300.

Figure 51:
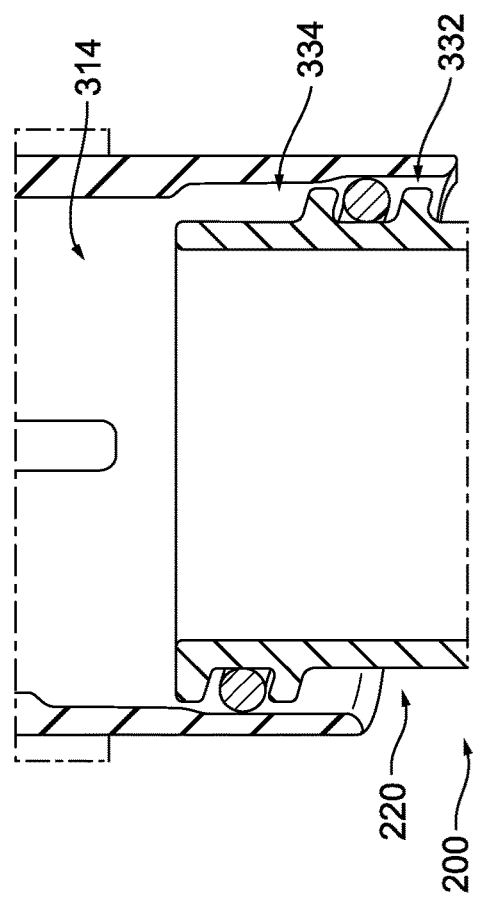
FIG. 51 is a side cross-sectional view of a partially installed filter cartridge.
Figure 52:
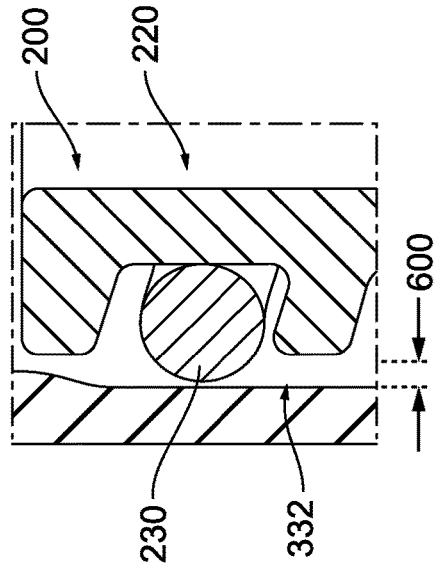
FIG. 52 is a reproduction of FIG. 51 near a sealing member of the filter cartridge.
Figure 53:
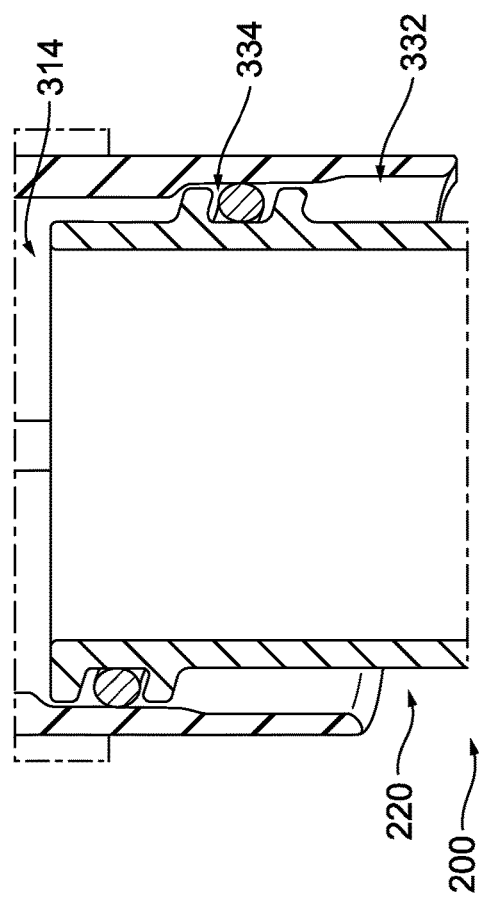
FIG. 53 is a side cross-sectional view of a fully installed filter cartridge.
Figure 54:
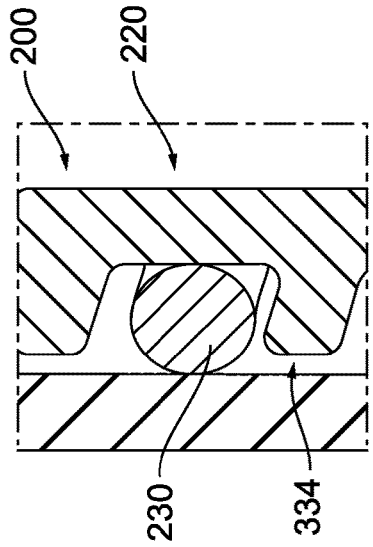
FIG. 54 is a reproduction of FIG. 53 near a sealing member of the filter cartridge.

As shown in FIGS. 51-54, block 512 may additionally include pressing the interface member 220 of the filter cartridge 200 into the recessed area 314, from the first inner surface 332 of the recessed area 314 to the second inner surface 334 of the recessed area 314. As shown in FIGS. 51-52, during a first part of the assembly process, a radial gap 600 is formed between the sealing member 230 and the first inner surface 332 of the recessed area 314. In a fully installed position, as shown in FIGS. 53-54, the sealing member 230 presses against the second inner surface 334, thereby sealing the filter cartridge 200 to the filter head 300. In other example embodiments, the method may include additional, fewer, and/or different operations.

IV. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "approximately," "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "attached," and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language a "portion" is used, the item can include a portion and/or the entire item unless specifically stated to the contrary.

What is claimed is:

1. A liquid filtration system, comprising:
   a filter head comprising a skirt, the skirt having a ramp disposed at a first end of the skirt, the ramp defining a stepwise transition in an axial height of the skirt;
   a shell housing coupled to the filter head; and
   a filter cartridge disposed within the shell housing, the filter cartridge comprising:
      a filter media pack; and
      an endcap coupled to a first end of the filter media pack, the endcap comprising an interface member extending from an upper surface of the endcap, the interface member comprising a sealing member that is at least partially tilted at an oblique angle with respect to a central axis of the filter cartridge, the sealing member sealingly engaged with the skirt.

2. The liquid filtration system of claim 1, wherein the endcap includes an anti-rotation member engaging the interface member and extending radially away from the interface member such that when the shell housing is fully installed onto the filter head the anti-rotation member is engageable with the ramp with no radial gap between the ramp and the interface member.

3. A liquid filtration system, comprising:
   a filter head comprising a skirt, the skirt having a ramp disposed at a first end of the skirt;
   a shell housing coupled to the filter head; and
   a filter cartridge disposed within the shell housing, the filter cartridge comprising:
      a filter media pack; and
      an endcap coupled to a first end of the filter media pack, the endcap comprising an interface member extending from an upper surface of the endcap, the interface member comprising a sealing member that is at least partially tilted at an oblique angle with respect to a central axis of the filter cartridge, the sealing member sealingly engaged with the skirt, wherein the endcap includes an anti-rotation member engaging the interface member and extending radially away from the interface member such that when the shell housing is fully installed onto the filter head the anti-rotation member is engageable with the ramp with no radial gap between the ramp and the interface member, and wherein the anti-rotation member is a rectangular-shaped tab extending radially outward from the interface member and upwardly from the upper surface in a substantially perpendicular orientation relative to the upper surface.

4. The liquid filtration system of claim 2, wherein a height of the anti-rotation member is approximately equal to a height of the ramp at a leading edge of the ramp.

5. The liquid filtration system of claim 1, wherein the skirt defines a cylindrically-shaped recessed area that is sized to receive the interface member therein.

6. A liquid filtration system, comprising:
   a filter head comprising a skirt, the skirt having a ramp disposed at a first end of the skirt;
   a shell housing coupled to the filter head; and
   a filter cartridge disposed within the shell housing, the filter cartridge comprising:
      a filter media pack; and
      an endcap coupled to a first end of the filter media pack, the endcap comprising: an interface member extending from an upper surface of the endcap, the interface member comprising a sealing member that is at least partially tilted at an oblique angle with respect to a central axis of the filter cartridge, the sealing member sealingly engaged with the skirt, wherein the skirt further comprises a first inner surface and a second inner surface, wherein an inner diameter of the second inner surface is less than an inner diameter of the first inner surface, and wherein a transition between the first inner surface and the second inner surface is oriented parallel to the sealing member.

7. The liquid filtration system of claim 6, wherein the transition between the first inner surface and the second inner surface is tilted at an angle with respect to the sealing member.

8. A liquid filtration system, comprising:
   a filter head comprising a skirt, the skirt having a ramp disposed at a first end of the skirt;
   a shell housing coupled to the filter head; and
   a filter cartridge disposed within the shell housing, the filter cartridge comprising:
      a filter media pack; and an endcap coupled to a first end of the filter media pack, the endcap comprising: an interface member extending from an upper surface of the endcap, the interface member comprising a sealing member that is at least partially tilted at an oblique angle with respect to a central axis of the filter cartridge, the sealing member sealingly engaged with the skirt, wherein the skirt further comprises a seal disruptor that comprises a rib or an indentation, the seal disruptor extending downwardly from a second end of the skirt toward the filter cartridge.

9. The liquid filtration system of claim 8, further comprising a plurality of seal disruptors disposed along perimeter of the skirt, wherein a lower edge of each one of the plurality of seal disruptors extends upwardly from a reference plane that is oriented parallel to the sealing member.

10. The liquid filtration system of claim 1, wherein the interface member comprises a cylindrically-shaped protrusion, the cylindrically-shaped protrusion defining a central opening that extends through the endcap.

11. A liquid filtration system, comprising:
a filter head comprising a skirt, the skirt having a ramp disposed at a first end of the skirt;
a shell housing coupled to the filter head; and
a filter cartridge disposed within the shell housing, the filter cartridge comprising:
a filter media pack; and
an endcap coupled to a first end of the filter media pack, the endcap comprising: an interface member extending from an upper surface of the endcap, the interface member comprising a sealing member that is at least partially tilted at an oblique angle with respect to a central axis of the filter cartridge, the sealing member sealingly engaged with the skirt, wherein a first portion of the sealing member is tilted at a first angle, and wherein a second portion of the sealing member is tilted at a second angle that is different from the first angle.

12. The liquid filtration system of claim 1, wherein the interface member further comprises a protrusion extending from the upper surface, the protrusion including an opening extending radially therethrough.

13. A liquid filter cartridge, comprising:
a filter media pack; and
an endcap coupled to a first end of the filter media pack, the endcap comprising an interface member extending from an upper surface of the endcap, the interface member comprising a sealing member that is at least partially tilted at an oblique angle with respect to a central axis of the filter media pack, a first portion of the sealing member is tilted at a first angle, and a second portion of the sealing member is tilted at a second angle that is different from the first angle.

14. The liquid filter cartridge of claim 13, wherein the endcap includes an anti-rotation member engaging the interface member and extending radially away from the interface member.

15. The liquid filter cartridge of claim 13, wherein the interface member further comprises a protrusion extending from the upper surface, the protrusion including an opening extending radially therethrough.

16. The liquid filter cartridge of claim 13, wherein the interface member comprises a cylindrically-shaped protrusion, the cylindrically-shaped protrusion defining a central opening that extends through the endcap.

17. The liquid filter cartridge of claim 13, wherein the interface member includes an upper extension piece and a lower extension piece that each extend radially outward from the endcap, the upper extension piece and the lower extension piece together defining a groove that is sized to receive the sealing member therein.

18. A method, comprising:
providing a filter head, the filter head comprising a skirt, the skirt having a ramp at a first end of the skirt, the ramp defining a stepwise transition in an axial height of the skirt;
providing a shell housing;
providing a filter cartridge, the filter cartridge comprising a filter media pack and an endcap coupled to a first end of the filter media pack, the endcap comprising an interface member extending from an upper surface of the endcap, the interface member comprising a sealing member that is tilted at an oblique angle with respect to a central axis of the filter cartridge;
joining the filter cartridge to the shell housing; and
installing the shell housing onto the filter head to sealingly engage the sealing member to the skirt.

19. The method of claim 18, wherein the endcap further comprises an anti-rotation member extending radially outward from the interface member, and wherein installing the shell housing onto the filter head further comprises engaging the anti-rotation member with a leading edge of the ramp at a location that is adjacent to the sealing member with no radial gap therebetween.

20. The liquid filtration system of claim 1, wherein the ramp is formed in a helical shape that extends parallel to a central axis of the filter head, the liquid filtration system further comprising an anti-rotation member extending radially away from the interface member, the anti-rotation member engaging the skirt at a leading edge of the ramp.

* * * * *